(12) United States Patent
Miller et al.

(10) Patent No.: US 7,458,601 B2
(45) Date of Patent: Dec. 2, 2008

(54) COLLAPSIBLE CART FOR PAINT SPRAY PUMP

(75) Inventors: Robert E. Miller, Savage, MN (US); Terry R. Reents, Lakeville, MN (US); Wayne Robens, Lakeville, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 70 days.

(21) Appl. No.: 11/278,224

(22) Filed: Mar. 31, 2006

(65) Prior Publication Data

US 2007/0228697 A1 Oct. 4, 2007

(51) Int. Cl.
*B62B 1/00* (2006.01)
*B62B 3/00* (2006.01)

(52) U.S. Cl. .................. 280/651; 280/654; 280/655

(58) Field of Classification Search ............ 280/655, 280/652, 646, 654, 47.34, 47.33, 47.315, 280/62, 651, DIG. 6, 655.1, 40, 639, 644, 280/650, 658; 239/146, 127; 404/93, 94; 297/19, 34, 28, 284.2

See application file for complete search history.

(56) References Cited

U.S. PATENT DOCUMENTS

| | | | | |
|---|---|---|---|---|
| 1,686,599 A | * | 10/1928 | Corser et al. .................. 297/34 |
| 2,890,060 A | * | 6/1959 | Ott et al. ....................... 280/42 |
| 2,901,261 A | * | 8/1959 | Olvey .......................... 280/654 |
| 3,118,553 A | * | 1/1964 | Rosenzweig ............. 280/47.34 |
| 3,940,065 A | * | 2/1976 | Ware et al. .................. 239/146 |
| 4,071,922 A | * | 2/1978 | Davies et al. ................ 16/438 |
| 4,429,897 A | * | 2/1984 | Friedman et al. ............ 280/646 |
| RE31,760 E | * | 12/1984 | Kassai ......................... 280/644 |
| 4,526,399 A | * | 7/1985 | Holtz .......................... 280/655 |
| 4,624,602 A | * | 11/1986 | Kieffer et al. ............... 239/150 |
| 4,848,659 A | * | 7/1989 | Tadych ........................ 239/127 |
| 4,865,346 A | * | 9/1989 | Carlile ........................ 280/654 |
| 4,993,727 A | | 2/1991 | Vom Brauke et al. |
| 5,064,123 A | * | 11/1991 | Aiello et al. ................. 239/706 |
| 5,168,601 A | * | 12/1992 | Liu .............................. 16/445 |
| 5,263,789 A | * | 11/1993 | Torntore et al. ............... 404/93 |
| 5,346,370 A | * | 9/1994 | Krohn ......................... 417/223 |
| 5,441,297 A | * | 8/1995 | Krohn et al. ................. 280/655 |
| 5,626,352 A | | 5/1997 | Grace |
| 5,863,055 A | | 1/1999 | Kasravi et al. |

(Continued)

OTHER PUBLICATIONS

UK Search Report from related UK application GB 0705786.2, dated May 15, 2007, 3 pp.

*Primary Examiner*—Hau V Phan
(74) *Attorney, Agent, or Firm*—Faegre & Benson LLP

(57) ABSTRACT

A collapsible cart for paint sprayers including a pair of spaced apart legs, a pump support extending between the upper ends of the legs, a pair of feet, a handle extending above the pump support, and lock and release means connected to the handle, pump support and legs and operable for releasably locking the pump support and handle in a first position wherein the pump support positions the pump for operation and the handle is positioned to enable moving the cart assembly and wherein the lock and release means is further operable for releasably locking the pump support and handle in a second position wherein the cart assembly is collapsed and further wherein each foot is pivotable respect to the leg to which it is attached between a first position generally perpendicular to a lower frame member, and a second position generally adjacent to the lower frame member.

10 Claims, 45 Drawing Sheets

U.S. PATENT DOCUMENTS

| | | | |
|---|---|---|---|
| 5,915,723 A * | 6/1999 | Austin | 280/651 |
| 6,286,850 B1 * | 9/2001 | Conway | 280/302 |
| 6,299,195 B1 * | 10/2001 | Chan | 280/651 |
| 6,789,809 B2 * | 9/2004 | Lin | 280/47.25 |
| 6,805,307 B2 * | 10/2004 | Dorendorf et al. | 239/398 |
| 6,880,851 B1 * | 4/2005 | Summers et al. | 280/652 |
| 6,948,197 B1 * | 9/2005 | Chen | 403/97 |
| 7,073,734 B2 * | 7/2006 | Dorendorf et al. | 239/398 |
| 7,147,277 B1 * | 12/2006 | Miller | 297/19 |
| 2006/0145437 A1 | 7/2006 | Odgers | |

* cited by examiner

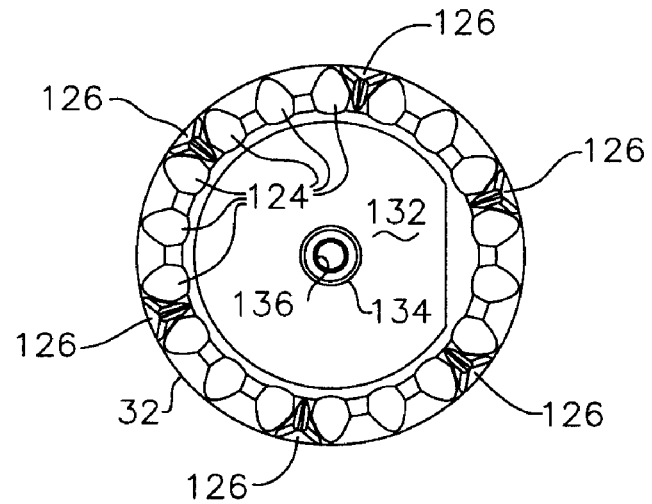
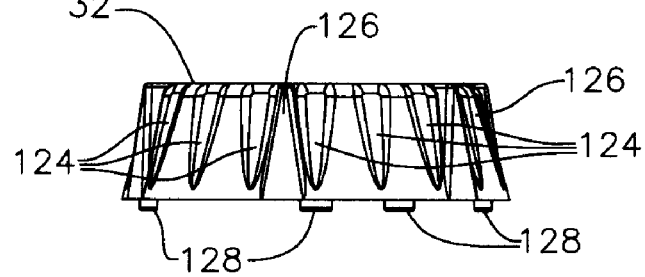
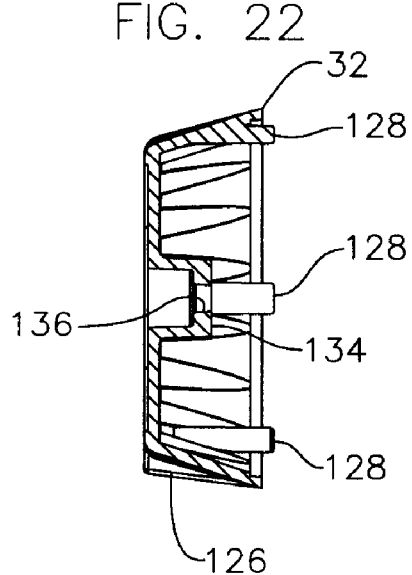
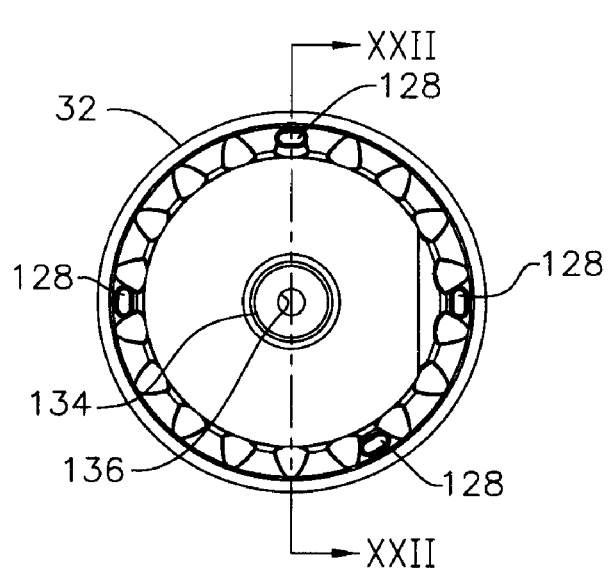

FIG. 31
FIG. 32
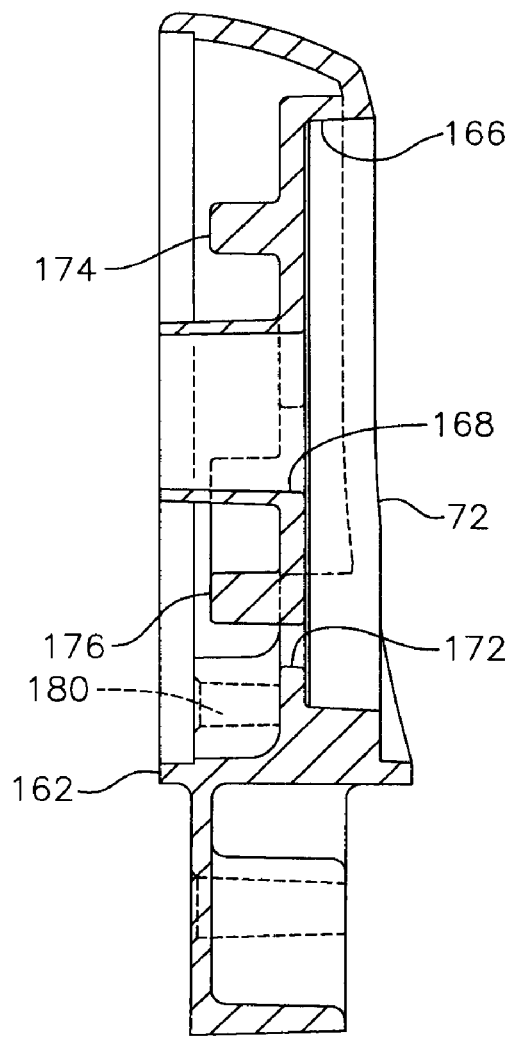
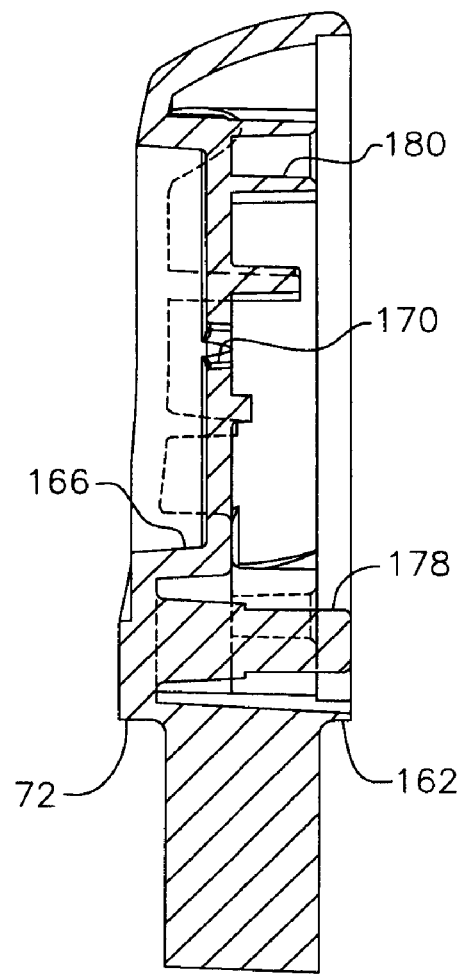

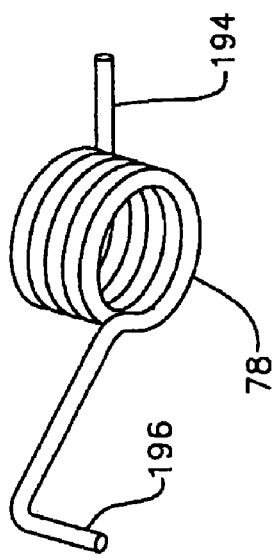
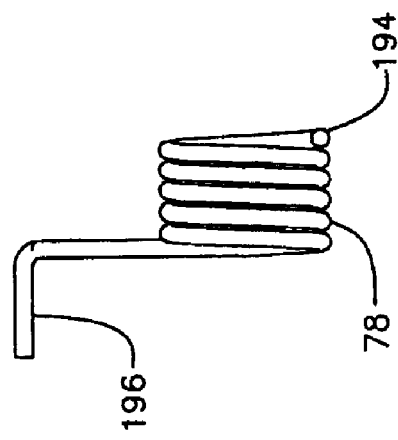
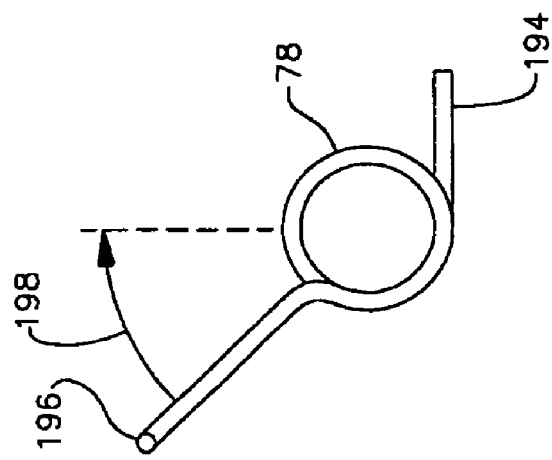

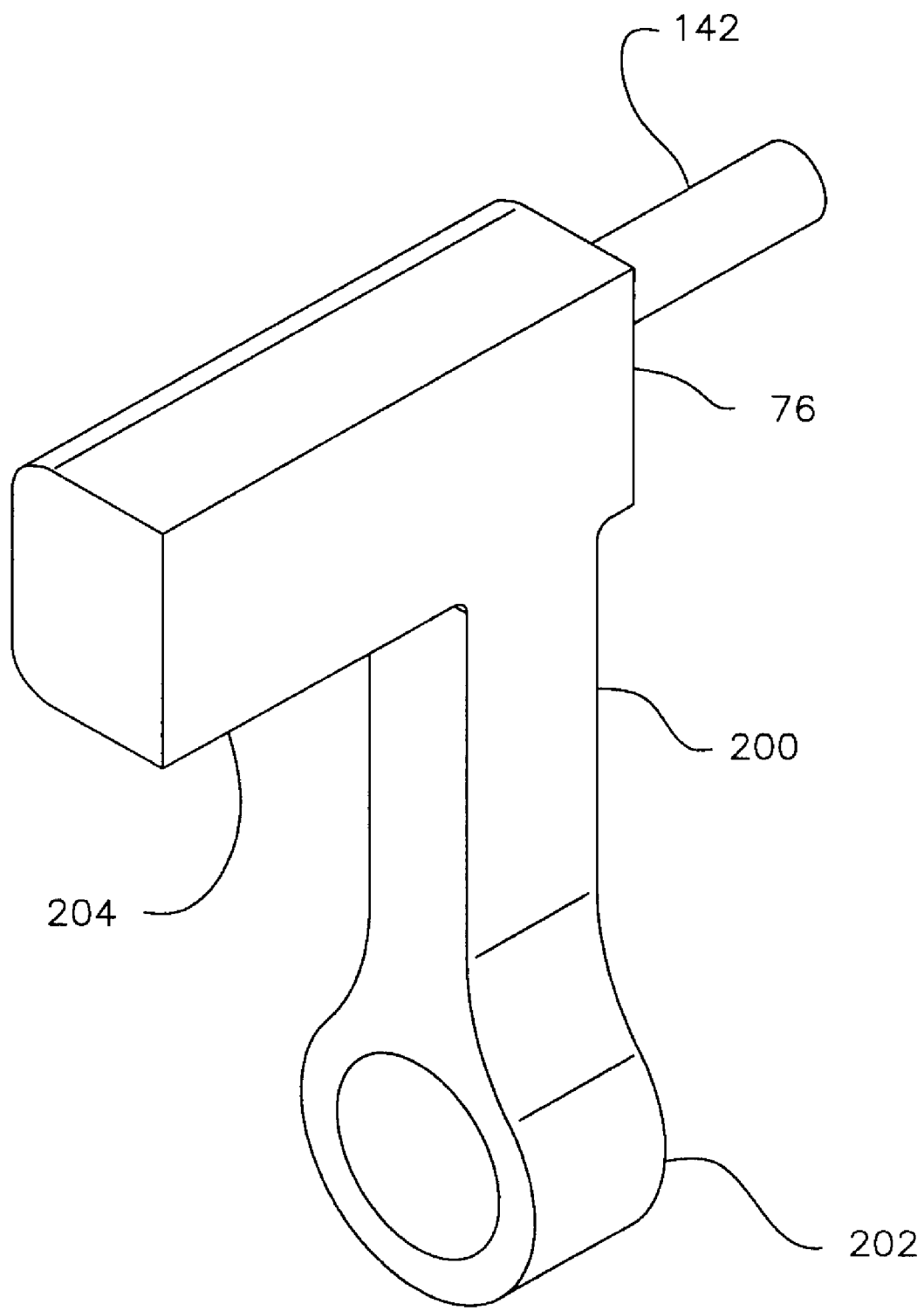

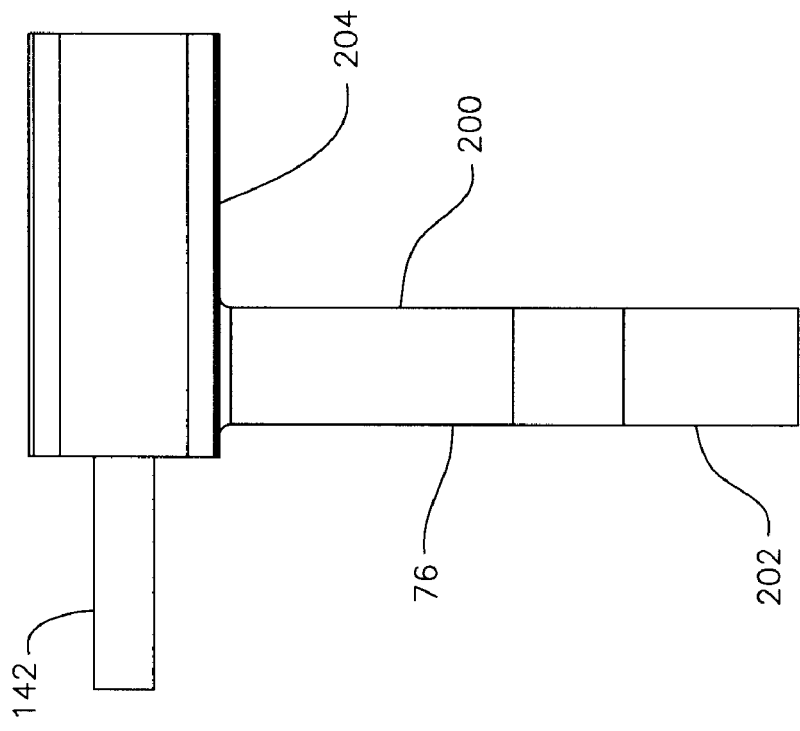
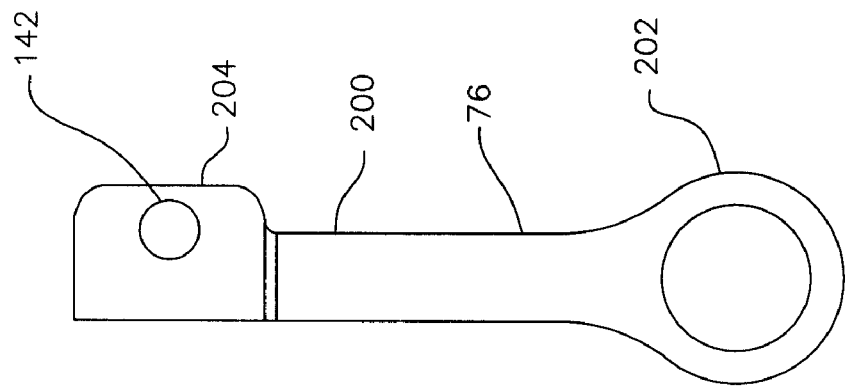

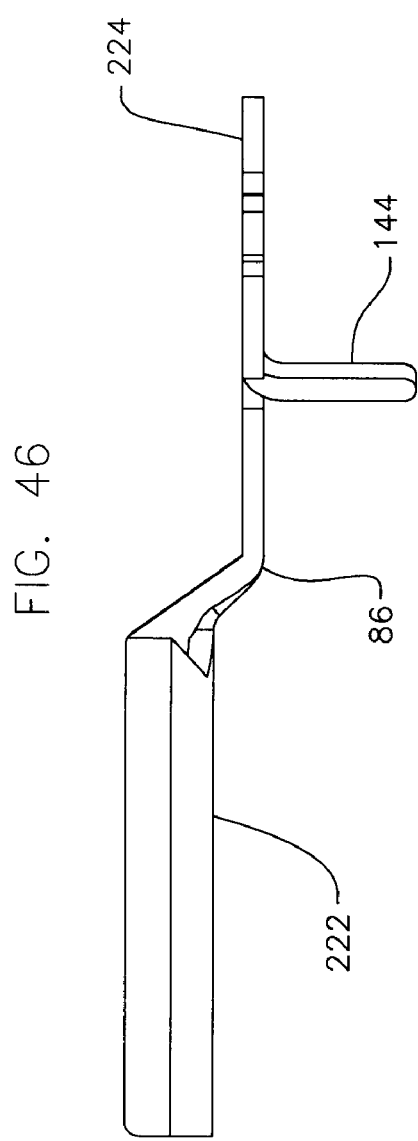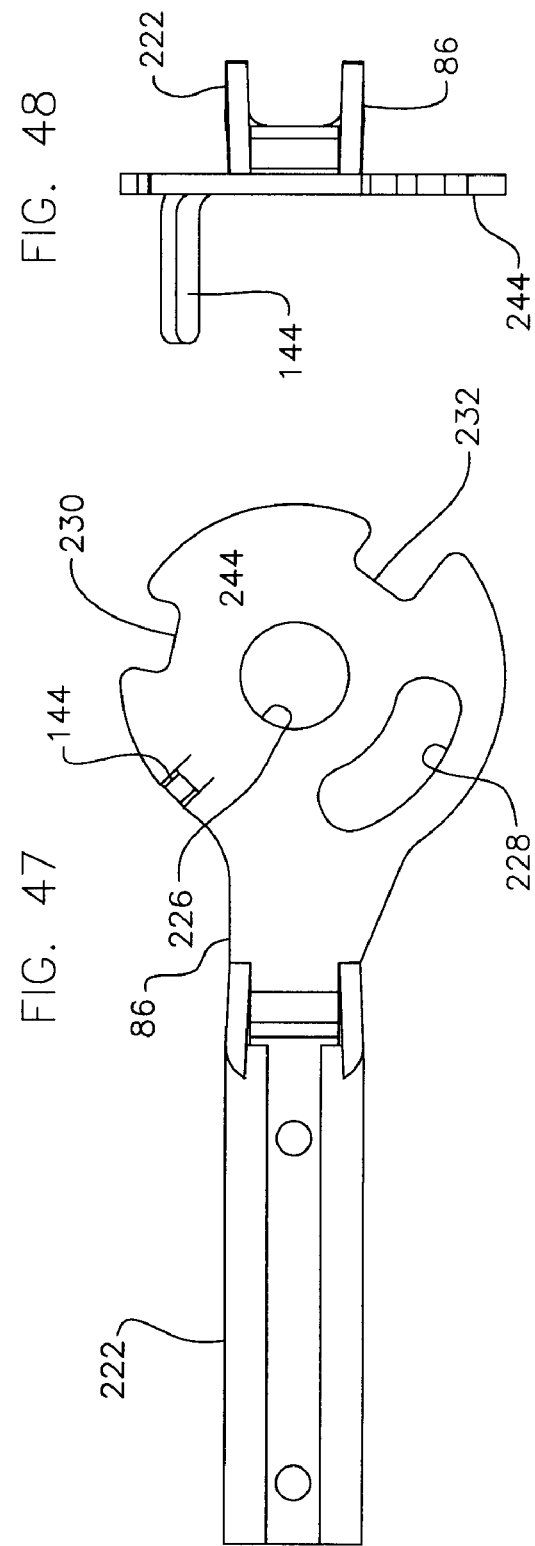

COLLAPSIBLE CART FOR PAINT SPRAY PUMP

BACKGROUND OF THE INVENTION

The present invention is directed to carts for paint spray pumps. In the past, such carts have typically been formed of rigid tubing to support a paint spray pump over a paint container, such as a 5 gallon bucket, to enable the pump to suction paint from the bucket, and to reposition the bucket by lifting the bucket by its bail when it was desired to reposition the pump and bucket. Prior art carts were typically fixed in their configuration, with some versions having limited collapsibility, for example, permitting collapse or removal of a handle. Nevertheless, such prior art carts required substantial volumetric space for storage and transport. Accordingly, there remained a need for a cart that was easy to collapse and required minimal space for storage and transport.

BRIEF SUMMARY OF THE INVENTION

The present invention provides a collapsible cart for paint spray pumps that is both easy to collapse and required minimal space when collapsed.

In one aspect, the present invention may be a collapsible cart assembly for a paint spray pump including a pair of spaced apart legs, each extending from a lower end to an upper end; a pump support extending between the upper ends of the legs; a pair of feet, with one foot associated with each leg at the lower end thereof; a handle extending above the pump support; and lock and release means connected to the handle, pump support and legs and operable for releasably locking the pump support and handle in a first position wherein the pump support positions the pump for operation and the handle is positioned to enable moving the cart assembly and wherein the lock and release means is further operable for releasably locking the pump support and handle in a second position wherein the cart assembly is collapsed.

In another aspect, the present invention may include a collapsible cart assembly for a paint spray pump having a pair of spaced apart legs, each extending from a lower end to an upper end; a lower frame member extending between the lower ends of the legs; and a pair of feet, with one foot associated with each leg at the lower end thereof and wherein each foot is pivotable respect to the leg to which it is attached between a first position wherein the foot is positioned generally perpendicular to the lower frame member to support the cart assembly in an upright condition, and a second position wherein the foot is positioned generally adjacent to the lower frame member to store the foot against the frame member.

In yet another aspect, the present invention may include a method of operating the collapsible cart assembly including the steps of unlocking a handle on a collapsible cart assembly by rotating a hub on the assembly to release the handle for rotation on a collapsible cart assembly; rotating a handle about the hub from an operating position to an intermediate position; continuing rotating the handle about the hub from the intermediate position to a storage position; and locking the handle in the storage position. In this aspect, the method may further include driving a pump support on the cart assembly from an operating position to a storage position when the handle moves from the intermediate position to the storage position. The method may still further include unlocking a pair of feet attached to the cart assembly by rotating a locking bail from a locked position intermediate the feet to an unlocked position out of the path of the feet; storing the feet by rotating the feet from an operating position towards the cart assembly to a storage position; and locking the feet in the storage position by rotating the locking bail from the unlocked position to the locked position wherein the bail retains the feet in the storage position.

BRIEF DESCRIPTION OF THE SEVERAL VIEWS OF THE DRAWINGS

FIG. 19 is an end view of the exterior of the cam knob of FIG. 17.

FIG. 20 is a side view of the cam knob of FIG. 17.

FIG. 21 is an end view of the interior of the cam knob of FIG. 17.

FIG. 22 is a section view taken along line XXII-XXII of FIG. 21.

FIG. 31 is a section view taken along line XXXI-XXXI of FIG. 30.

FIG. 32 is a section view taken along line XXXII-XXXII of FIG. 30.

FIG. 36 is a perspective view of a pawl spring useful in the practice of the present invention.

FIG. 37 is a side elevation view of the spring of FIG. 36.

FIG. 38 is a top plan view of the spring of FIG. 36.

FIG. 39 is a perspective view of a pawl useful in the practice of the present invention.

FIG. 40 is an side view of the pawl of FIG. 39.

FIG. 41 is an end view of the pawl of FIG. 39.

FIG. 46 is a side elevation view of the handle plate of FIG. 45.

FIG. 47 is a top plan view of the handle plate of FIG. 45.

FIG. 48 is an end view of the handle plate of FIG. 45.

FIG. 55 is a simplified side view of certain parts of the hub assembly showing certain parts to illustrate certain aspects of the present invention.

DETAILED DESCRIPTION OF THE INVENTION

Figure 1:
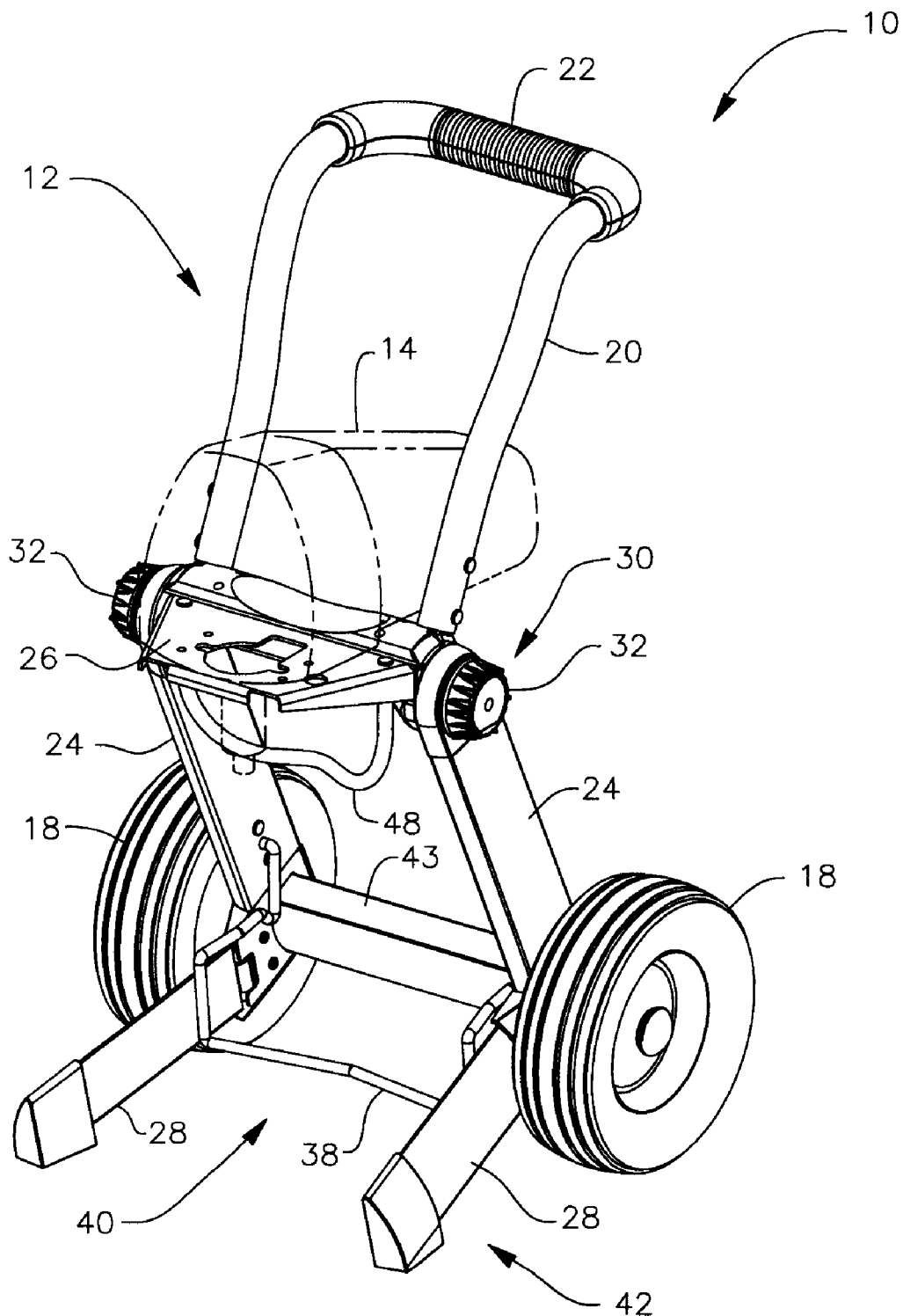
FIG. 1 is a perspective view of a cart assembly with a paint spray pump in phantom useful in the practice of the present invention, shown in an operating position.
Figure 2:
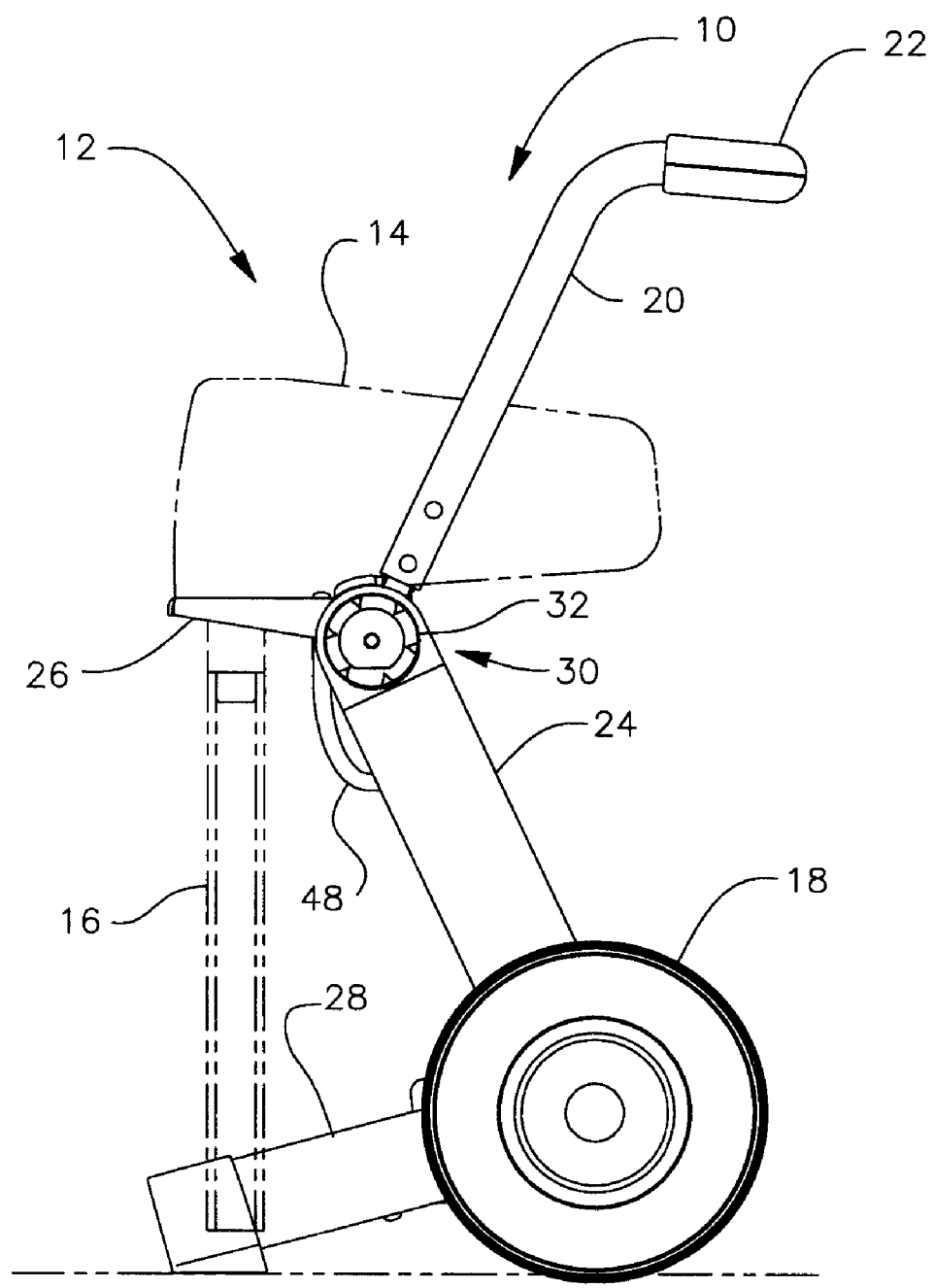
FIG. 2 is a side elevation view of the assembly of FIG. 1.
Figure 3:
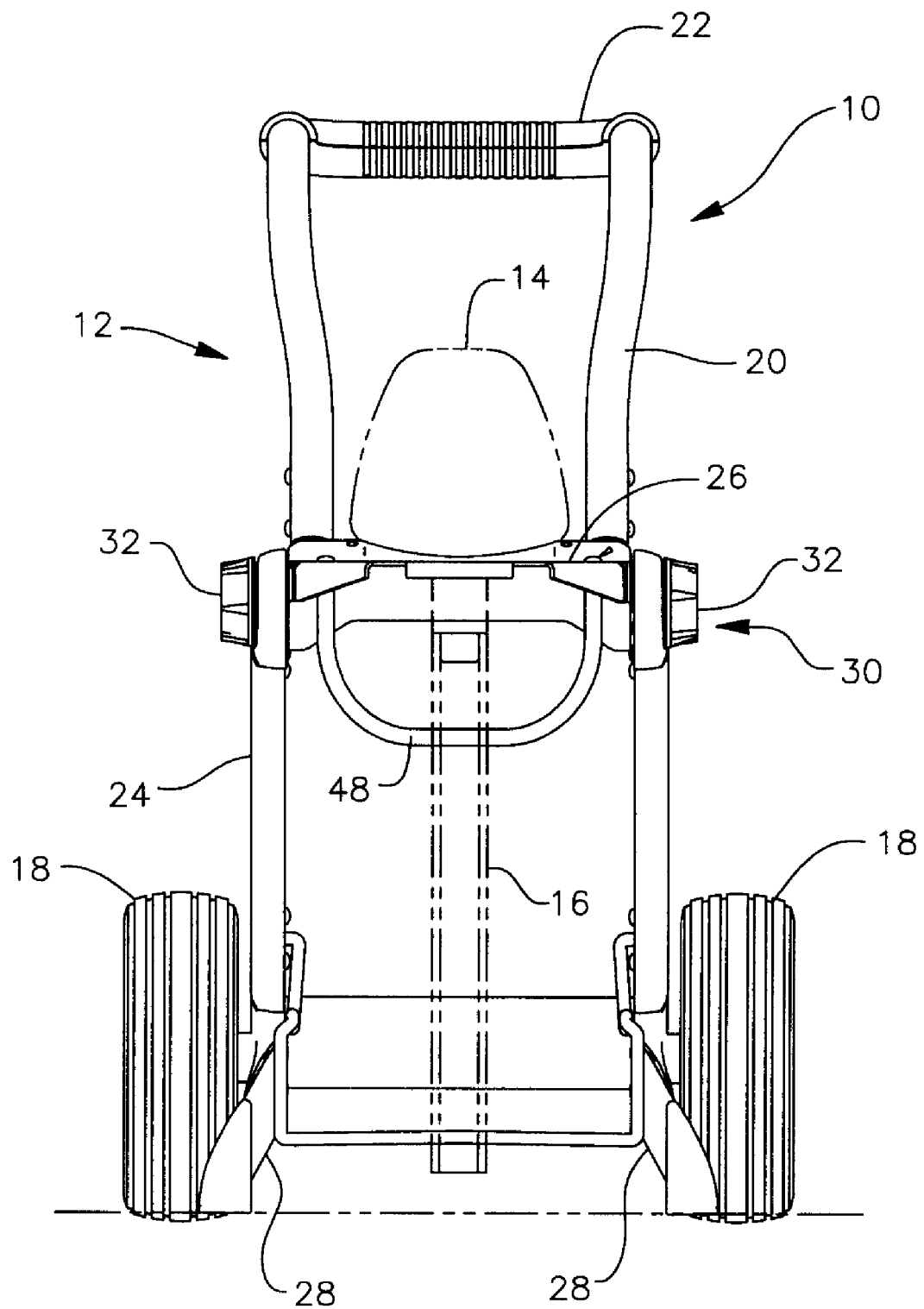
FIG. 3 is a front elevation view of the assembly of FIG. 1.

Referring to the Figures, and most particularly to FIGS. 1, 2 and 3, a collapsible cart assembly 10 of the present invention may be seen. Cart assembly 10 is shown in a first position 12 in these figures where the cart assembly or cart 10 is in an upright, self-supporting condition, and is designed to support a paint pump 14, shown in phantom. It is to be understood that pump 14 is a piston type pump having a cylindrical fluid section 16 (shown by double dashed lines in FIGS. 2 and 3), which is removable from the pump 14 for transportation, storage and service, as desired. It is to be further understood that the cart and pump and fluid section may be moved by rocking the cart back on a pair of wheels 18 to reposition the fluid section 16, for example, into and out of a paint container, such as a conventional 5 gallon bucket (not shown). Cart 10 may also have a handle 20 with a grip 22, and a pair of spaced apart legs 24 to support the paint pump 14 on a pump support 26 extending between the upper ends of the legs 24. Cart 10 may also have a pair of feet 28, with one foot associated with each leg at the lower end thereof. The handle 20 preferably extends above the pump support 26 when in the first or operating position 12.

Figure 7:
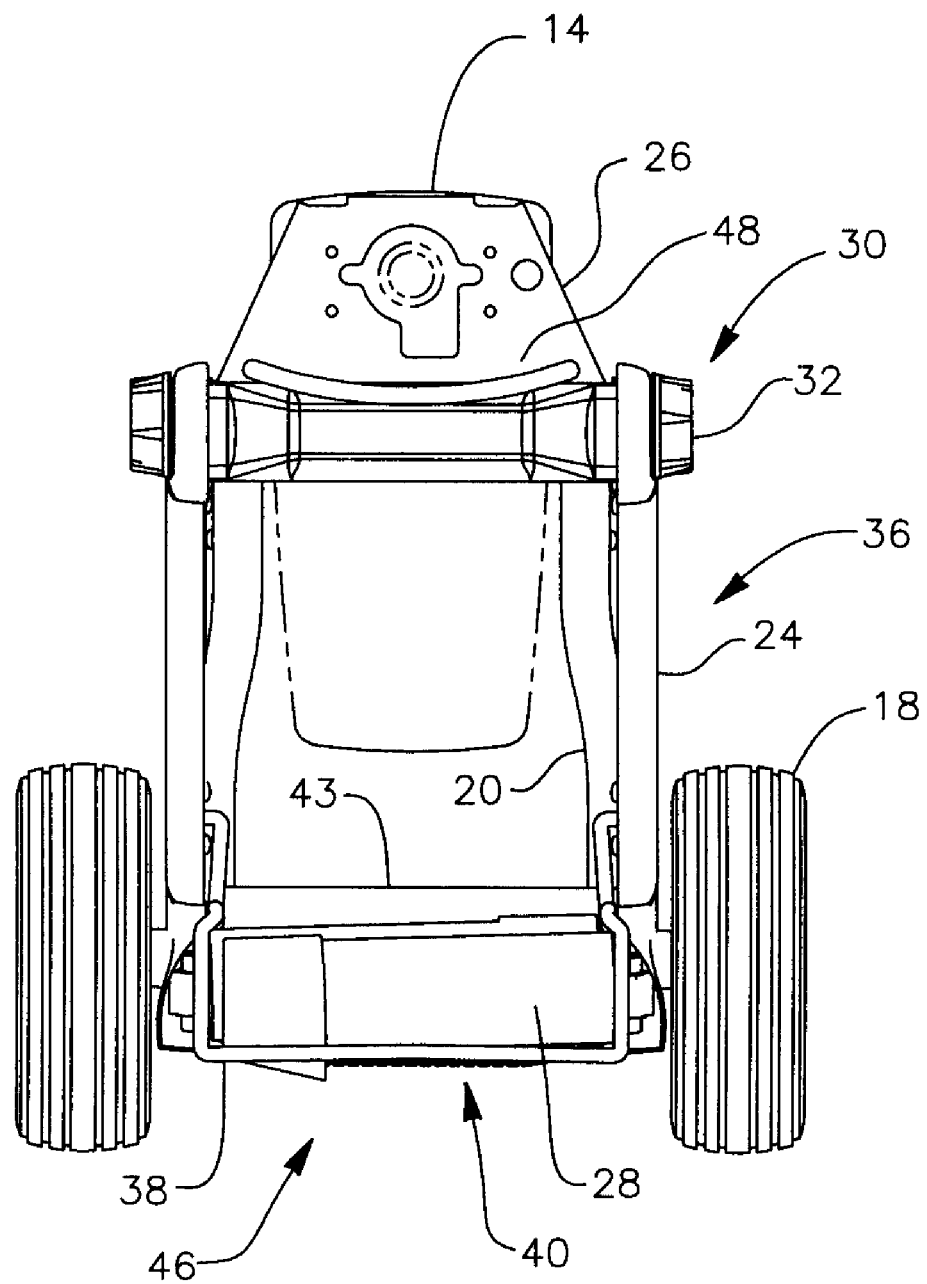
FIG. 7 is a bottom plan view of the assembly of FIG. 6, except with a pair of feet in the storage position.
Figure 8:
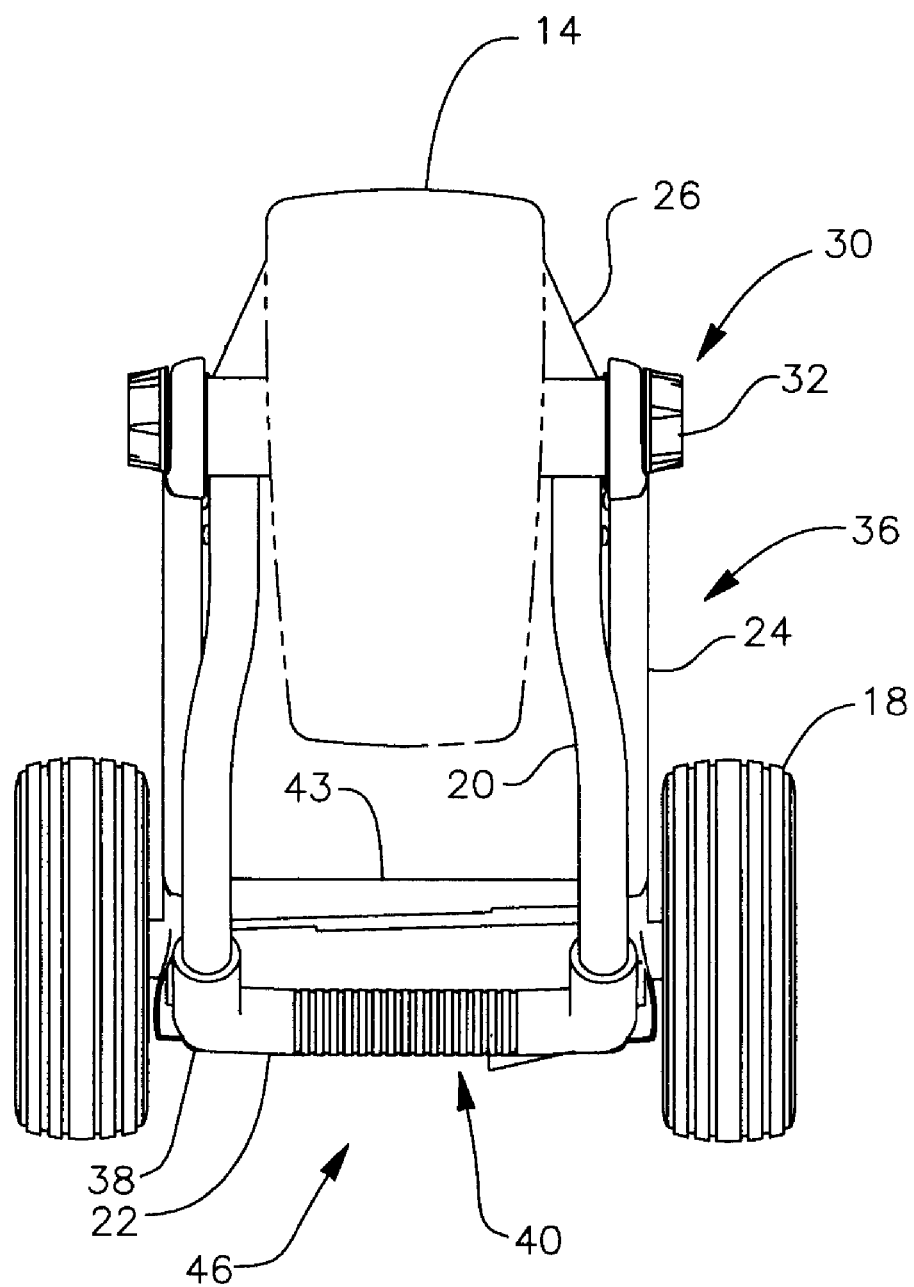
FIG. 8 is a top plan view of the assembly of FIG. 7 in the storage position.

Cart 10 also preferably has a lock and release means 30 connected to the handle, pump support and legs. The means 30 is operable to releasably lock the pump support and handle in the first position 12 wherein the pump support positions the pump for operation and the handle is positioned to enable moving the cart assembly (as described above) and wherein the lock and release means is further operable to release the handle and pump support to move out of the first position towards a second or storage position 36 (shown in FIGS. 7, 8, and 9). The lock and release means is also operable to releasably lock the pump support and handle in the second position wherein the cart assembly 10 is collapsed.

In one embodiment, the lock and release means 30 includes a mechanism having a hub with a manually operable cam knob 32 to release the handle to rotate about the hub, as will be further described, infra.

Figure 4:
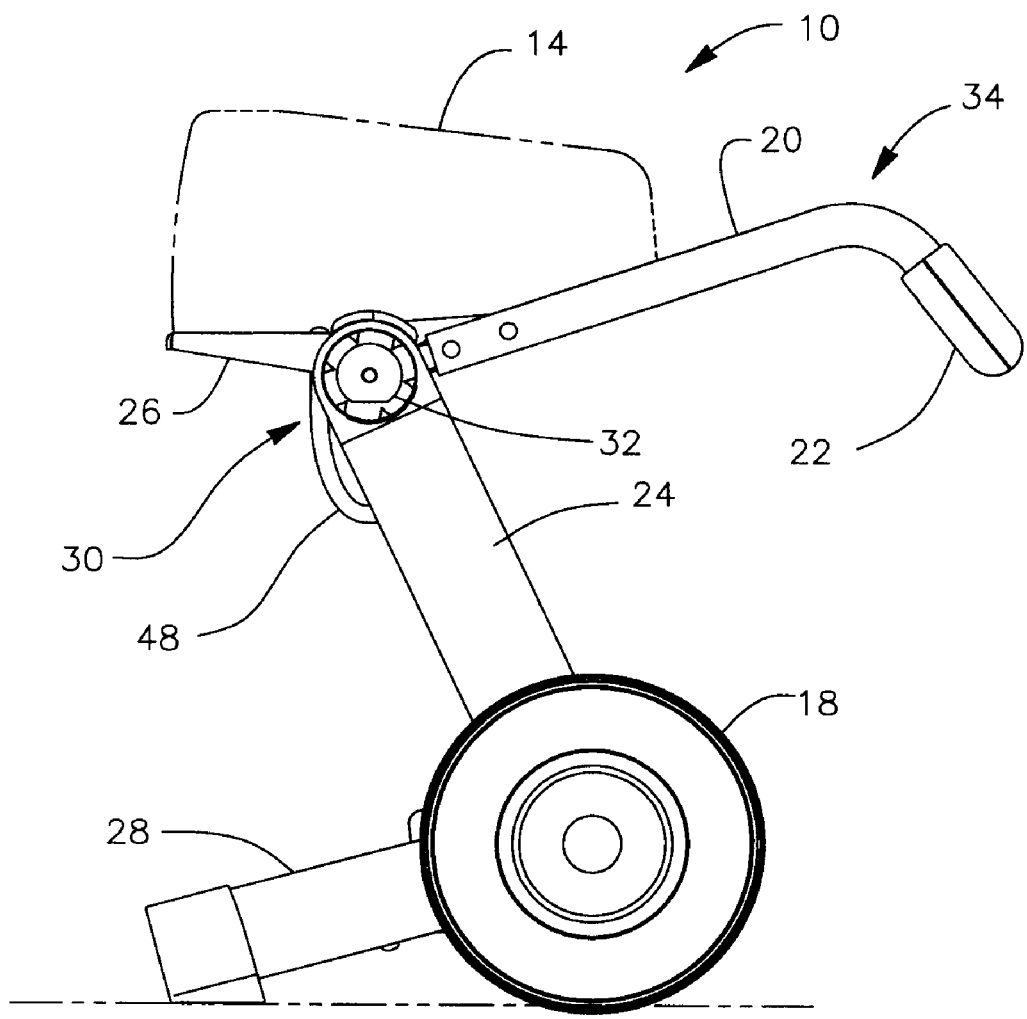
FIG. 4 is a view similar to that of FIG. 2, except with a handle in an intermediate position.
Figure 5:
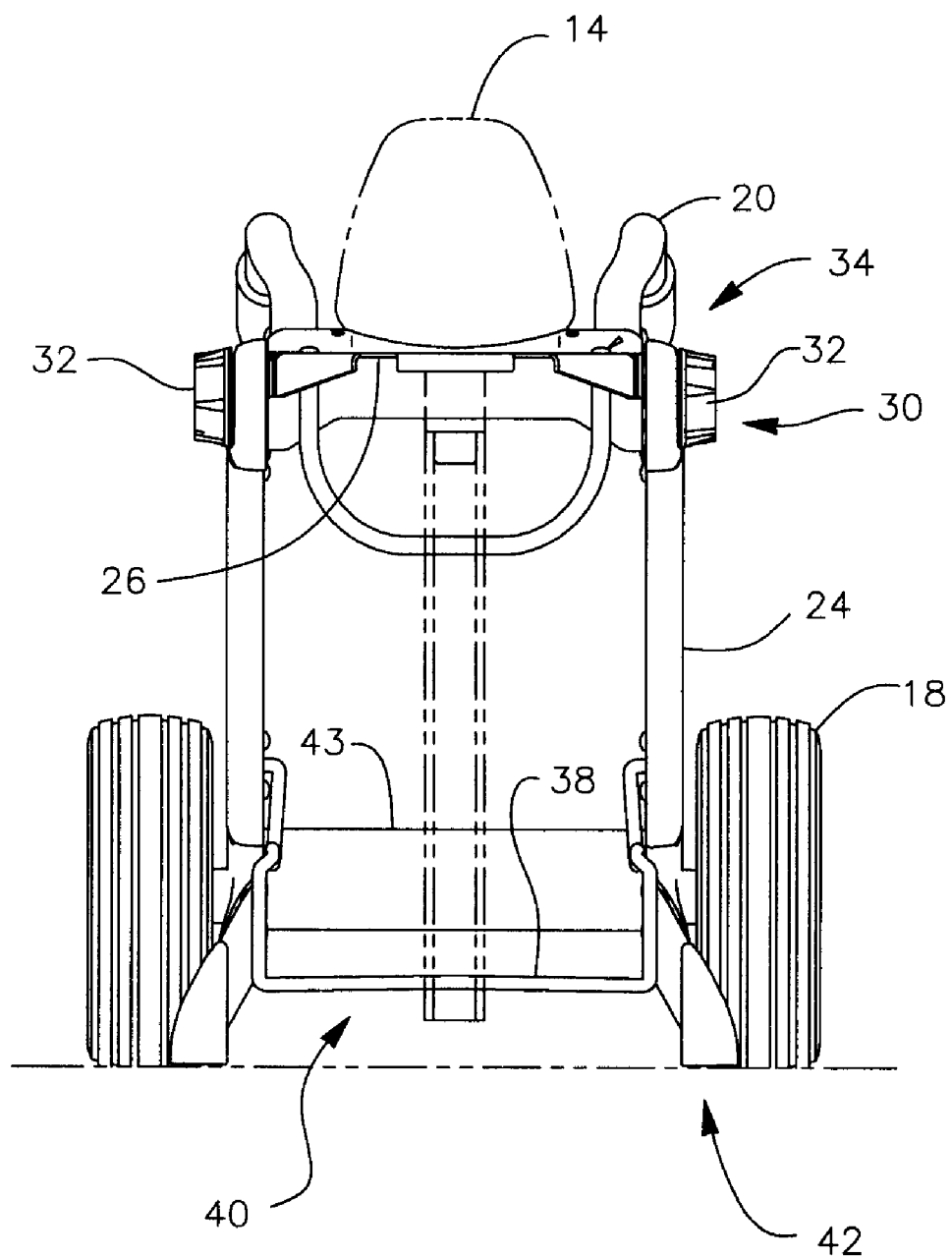
FIG. 5 is a view similar to that of FIG. 3, except with the handle in the intermediate position.
Figure 6:
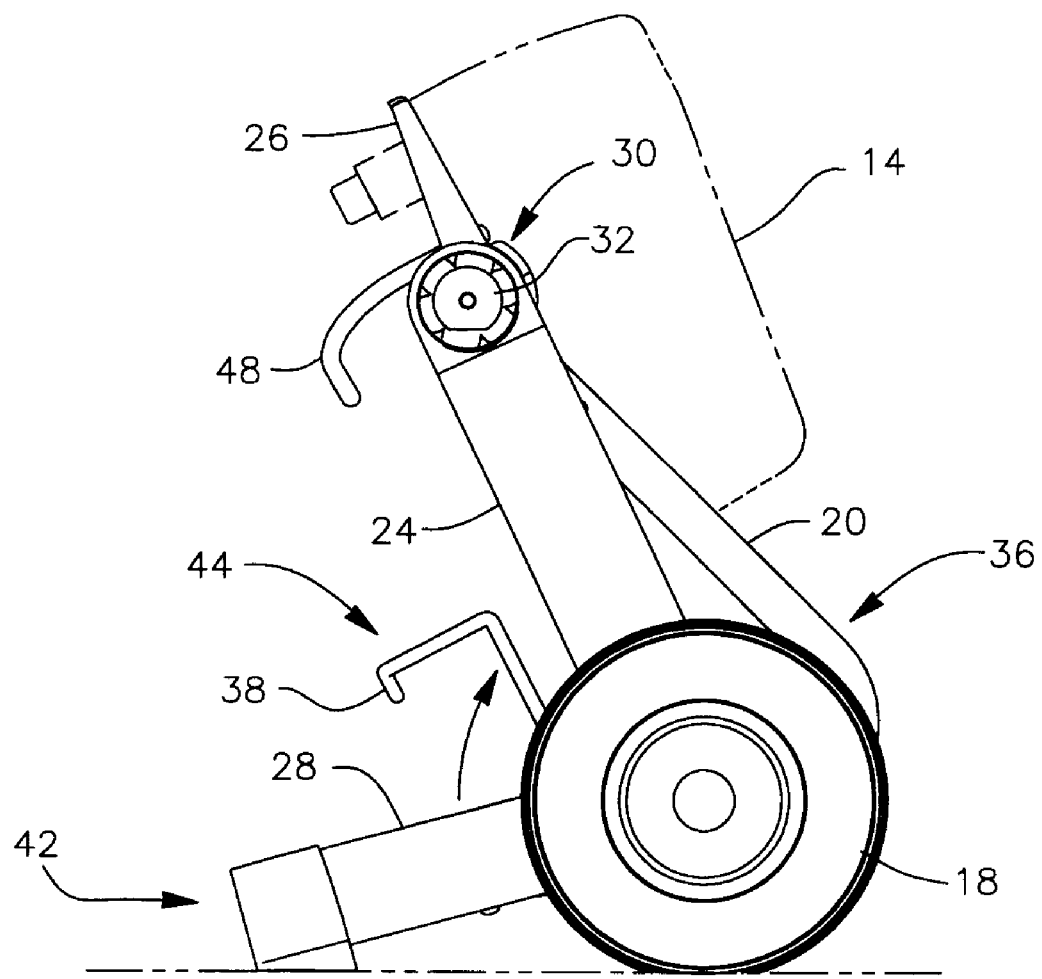
FIG. 6 is a view similar to that of FIG. 2, except with the handle and a pump support in a storage position.

The cart 10 may be collapsed by rotating one or both cam knobs 32 to release the handle after which the handle may be rotated from the first position 12 through an intermediate position 34 shown in FIGS. 4 and 5 to the second or storage position 36 shown in FIGS. 6, 7, 8 and 9. It is to be understood that as handle 20 is moved from the first position 12 to the intermediate position 34, the pump support remains as it was in the first position. As the handle 20 is moved from the intermediate position 34 to the storage position 36, pump support 26 rotates with handle 20 to move the pump support and the pump to the storage position 36, shown in FIGS. 6-9. It is also to be understood that the handle and pump support may be moved to the storage position as shown in FIG. 6 while the feet 28 continue to support the cart assembly 10, after which a wire bail 38 may be moved from a first position 40 wherein each foot is retained in an operating position 42 generally perpendicular to a lower frame member 43 to support the cart assembly in an upright condition, to a second position 44 wherein each foot is free to be moved to a storage position 46 generally adjacent to the lower frame member to store the foot against the frame member. Once the feet 28 are moved, the bail 38 may be returned from the second position 44 to the first position 40 to retain the feet in the storage position 46.

Figure 9:
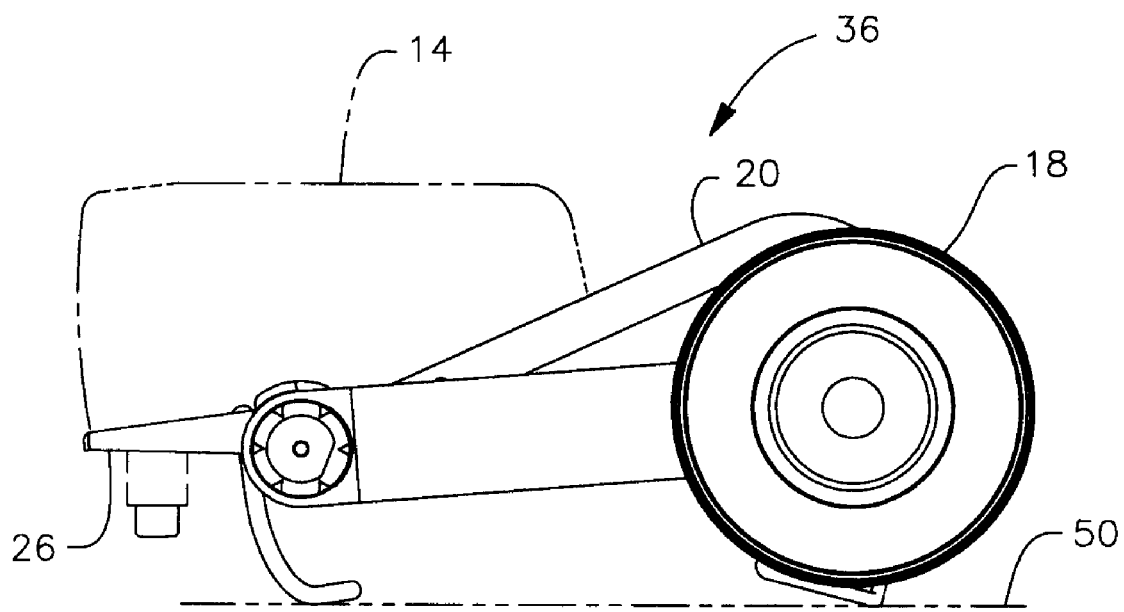
FIG. 9 is a side elevation view of the assembly of FIG. 7, showing parts in the storage position.

Cart 10 may also have a forward support bar 48 depending from the pump support. Bar 48 may serve as a handle to grasp the cart assembly 10 when in the folded or storage position 36 (most useful when the cart is oriented vertically), and may serve to support the pump off a supporting surface 50 when in the storage position (when the cart is oriented horizontally, as shown in FIG. 9).

Figure 10:
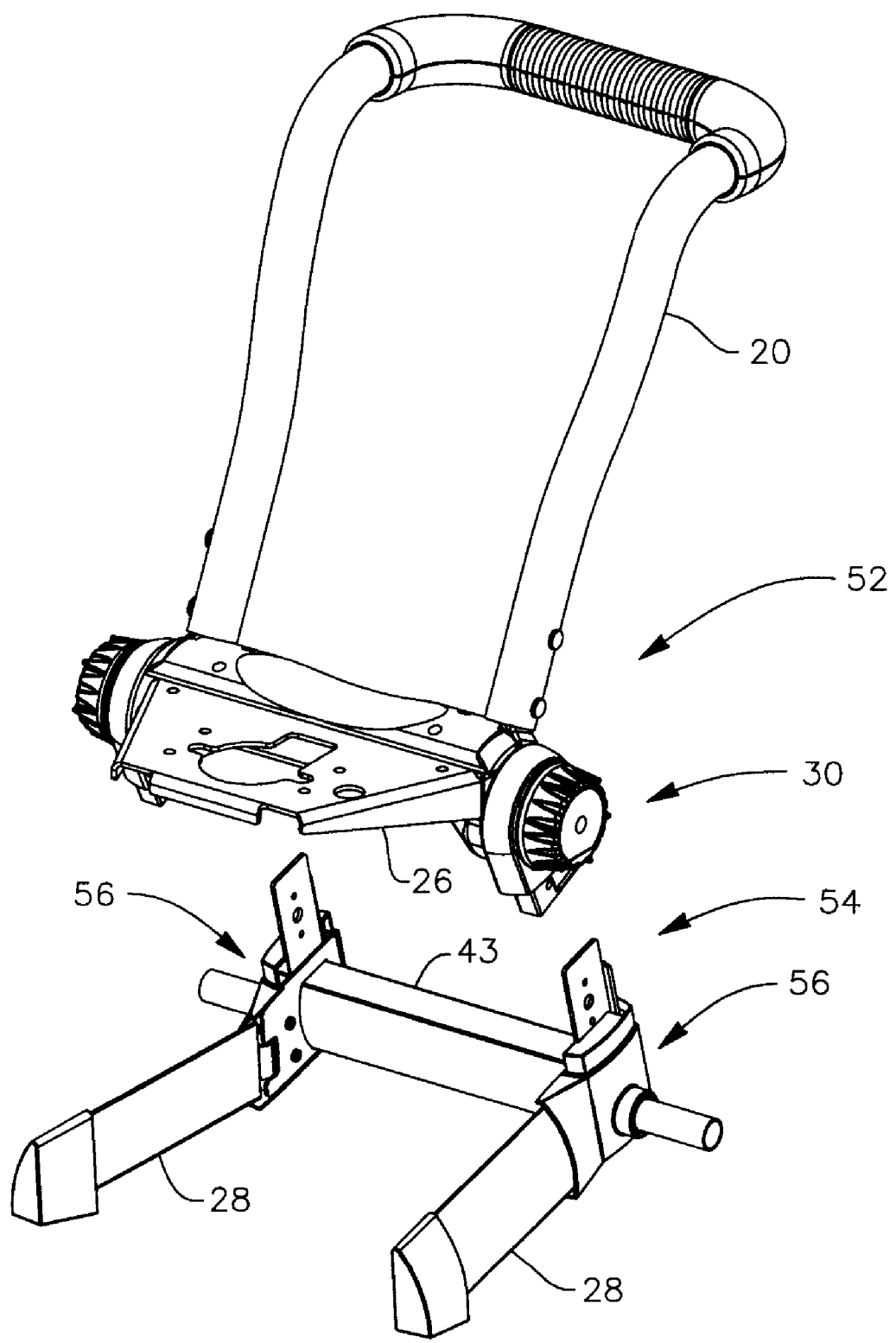
FIG. 10 is a perspective view similar to that of FIG. 1, except with parts omitted and with the cart assembly partially exploded to illustrate upper and lower carrier subassemblies useful in the practice of the present invention.

Referring to FIG. 10, it may be seen that the cart assembly 10 has two main subassemblies, an upper carrier assembly 52 and a lower carrier assembly 54. It is to be understood that carrier assemblies 52 and 54 are connected together by legs 24 which are omitted from FIG. 10 for clarity. Upper carrier assembly 52 includes the handle 20, the pump support 26 and the lock and release means 30. Lower carrier assembly includes the feet 28 and lower frame member 43 along with hinge assemblies 56 to connect the feet 28 to the lower frame member 43.

Figure 11:
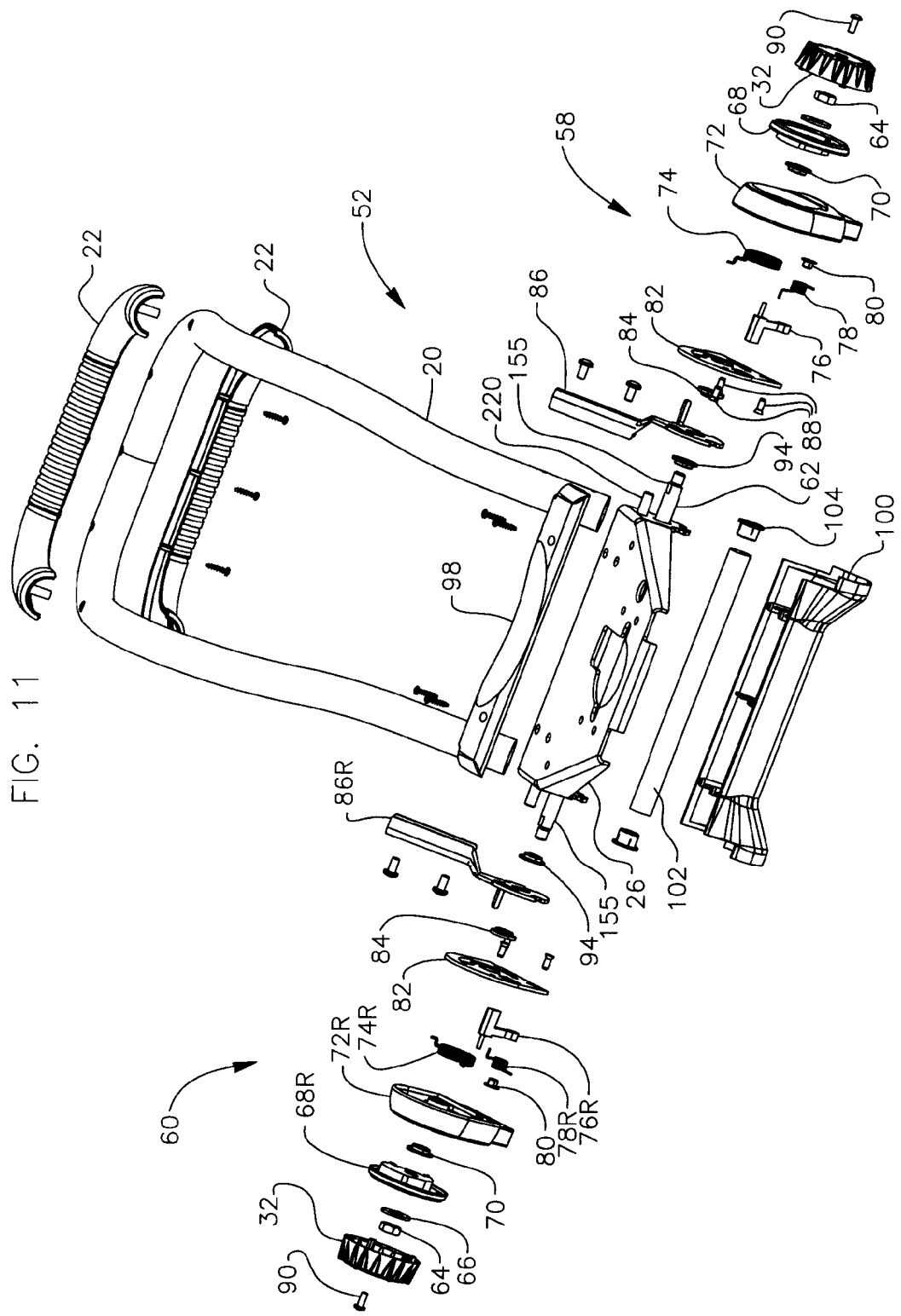
FIG. 11 is an exploded view of the upper carrier subassembly of FIG. 10.
Figure 12:
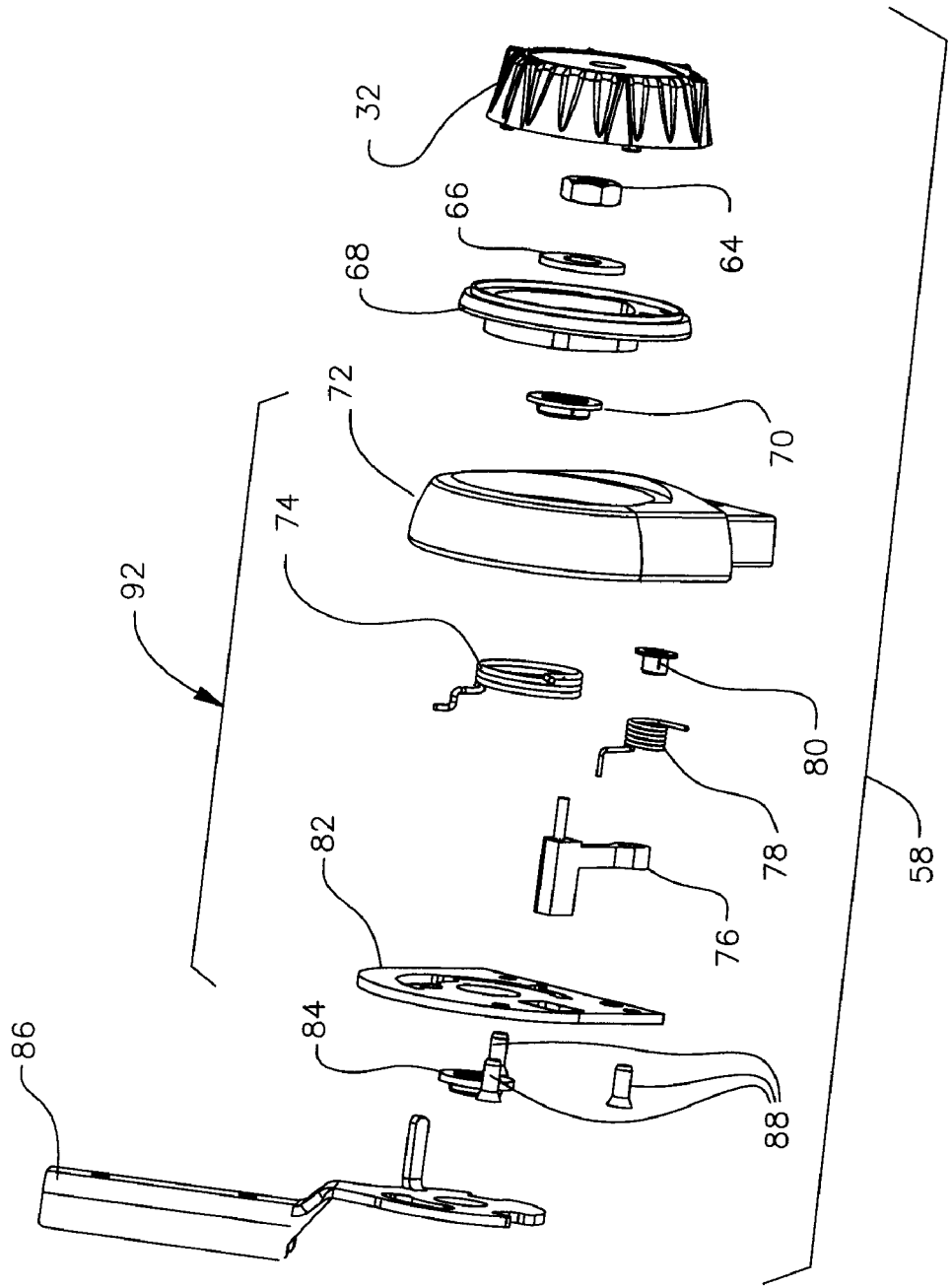
FIG. 12 is an enlarged view of the parts in the right hand side of FIG. 11.
Figure 13:
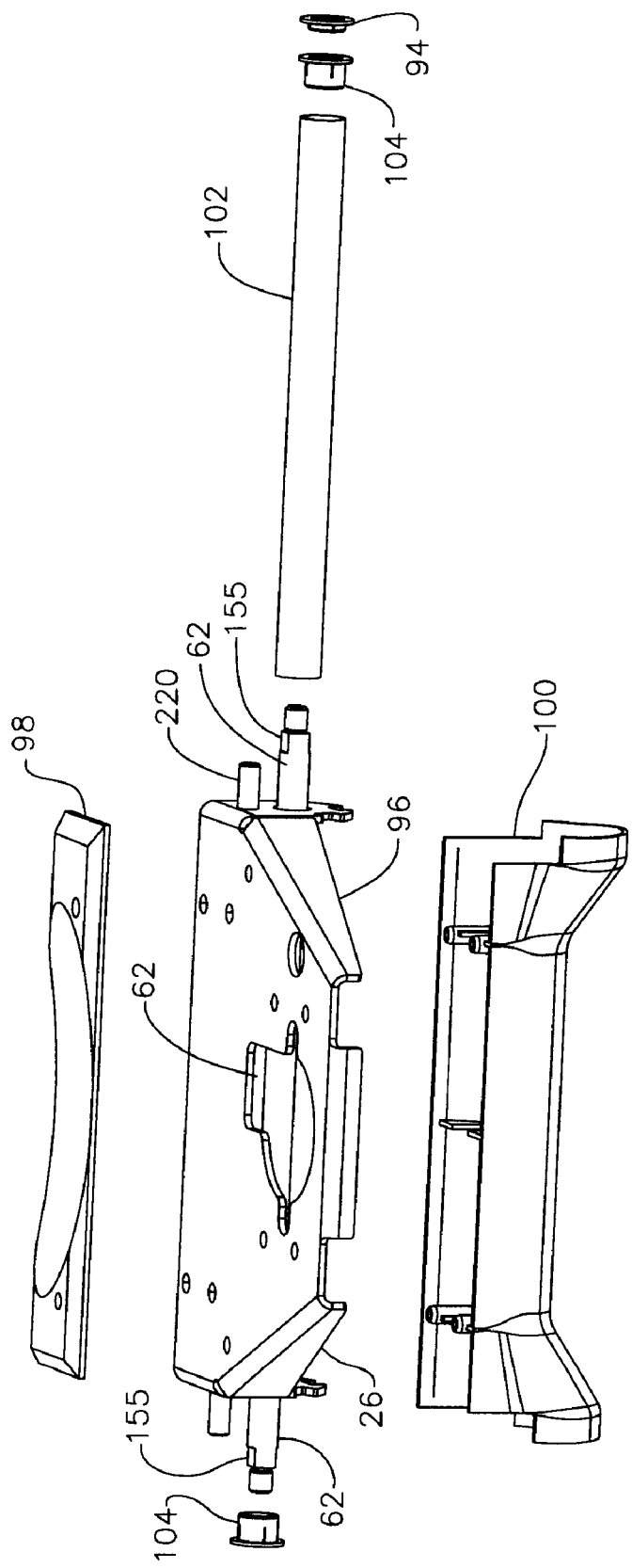
FIG. 13 is an enlarged view of the parts in the center of FIG. 11, with some parts repositioned to better illustrate their relationship.
Figure 14:
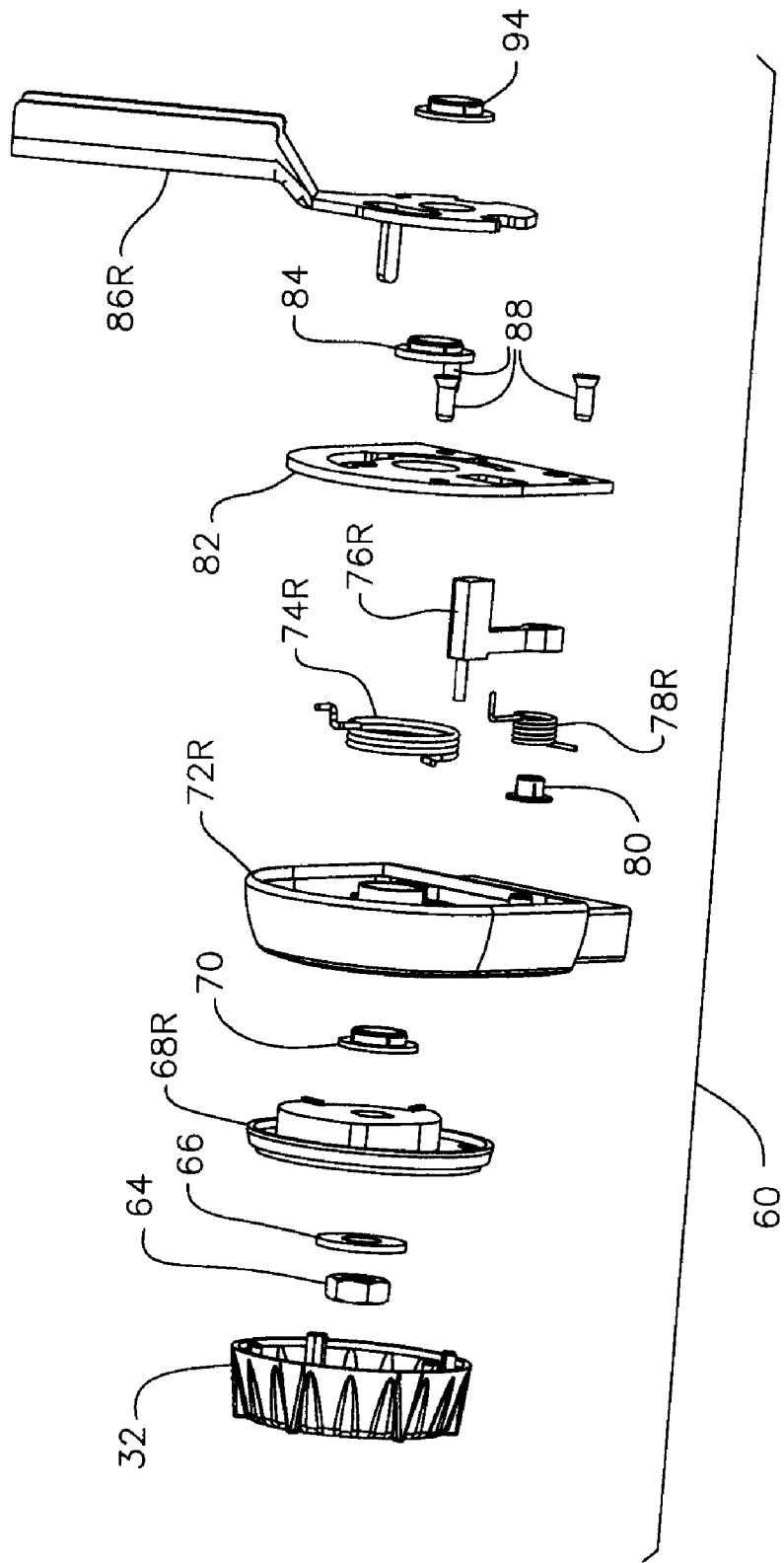
FIG. 14 is an enlarged view of the parts in the left hand side of FIG. 11.

Referring now to FIGS. 11, 12, 13, and 14 the upper carrier assembly 52 is shown in exploded view. FIG. 11 shows an overall exploded view, with FIG. 12 showing parts of a left hand portion 58 of the lock and release means 30. FIG. 13 shows details of the pump support 26, while FIG. 14 shows parts of a right hand portion 60 of the lock and release means 30. It is to be understood that the left and right hand portions 58 and 60 have the same parts with mirror image structures and that the left and right hand portions 58 and 60 are coupled together by a main pivot shaft 62 (shown in FIG. 13). In view of the mirror image relationship, only the left hand portion 58 will be described, with the understanding that the right hand portion 60 operates in a mirror image fashion to the left hand portion 58.

Left hand portion 58 includes the cam knob 32, a nut 64, a washer 66, a left pawl cam 68, an outer bushing 70, a left leg cap 72, a large spring 74, a pawl 76, a pawl spring 78 and a pawl bushing 80. Portion 58 also preferably includes a cap plate 82, an inner bushing 84, and a left handle plate 86. Conventional threaded fasteners 88 may be used to secure cap plate 82 to left leg cap 72 to retain the spring 74, pawl 76, pawl spring 78 and pawl bushing 80 between the cap plate 82 and the left leg cap 72 in a left leg cap subassembly 92. Nut 64 secures the left pawl cam 68 to shaft 62, with the subassembly 92, the inner and outer bushings 84, 70, and left leg plate 86 captured between cam 68 and shaft 62 when assembled. Cam knob 32 is secured to shaft 62 by another conventional fastener 90, as shown in FIG. 11, it being understood that shaft 62 is solid between left and right half portions 58 and 60, and has internal and external threads at each end thereof to mate, respectively, with fasteners 90 and nuts 64. Mirror image parts shown in FIG. 14 are marked with a suffix "R" while identical parts are marked without a suffix. A pair of short bearing flanges 94 are received on shaft 62 to support the handle plates 86, 86R.

Referring most particularly to FIG. 13, the pump support 26 may include a pump support plate 96, an upper carrier cover 98 and a lower carrier cover 100. A center axle spacer 102 in the form of a hollow tube is received over shaft 62 and has a long bearing flange 104 at each end thereof.

Figure 15:
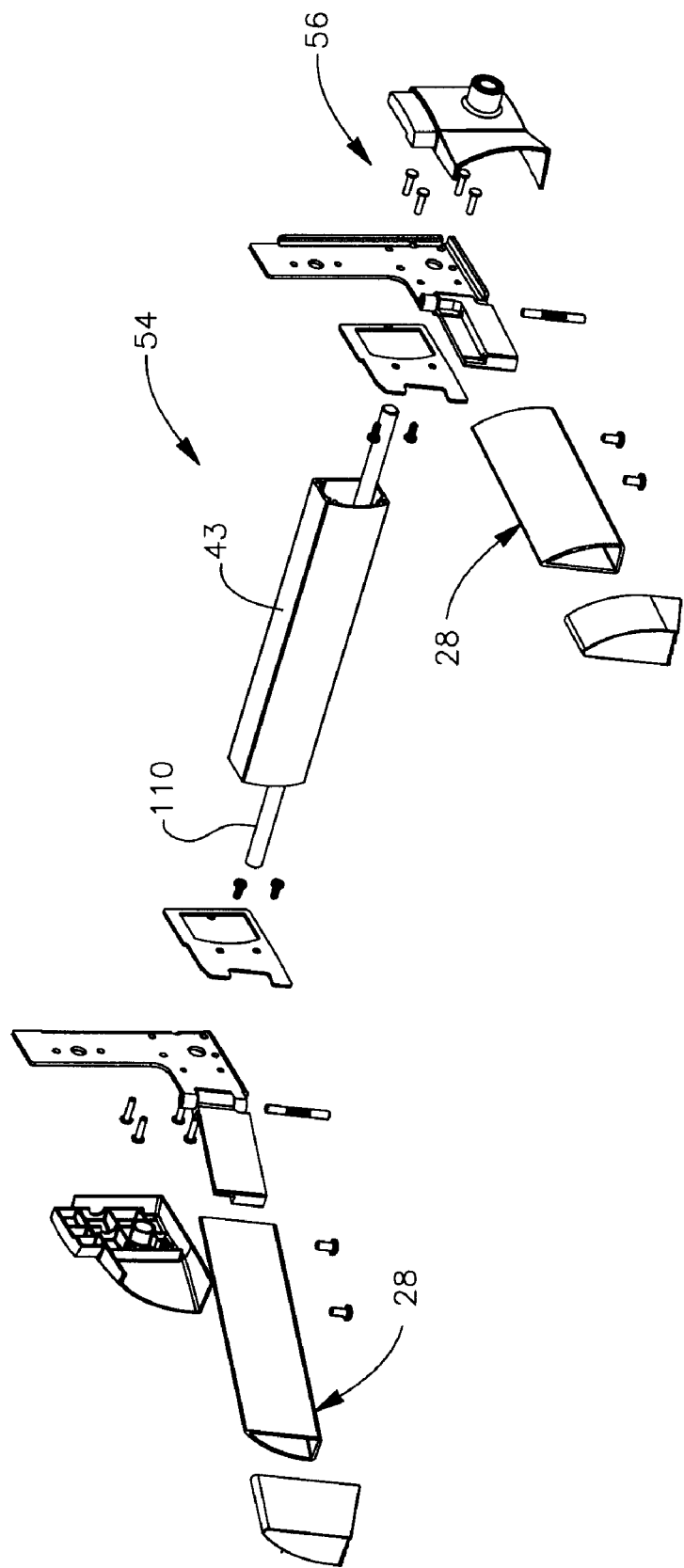
FIG. 15 is an exploded view of the lower carrier assembly of FIG. 10.
Figure 16:
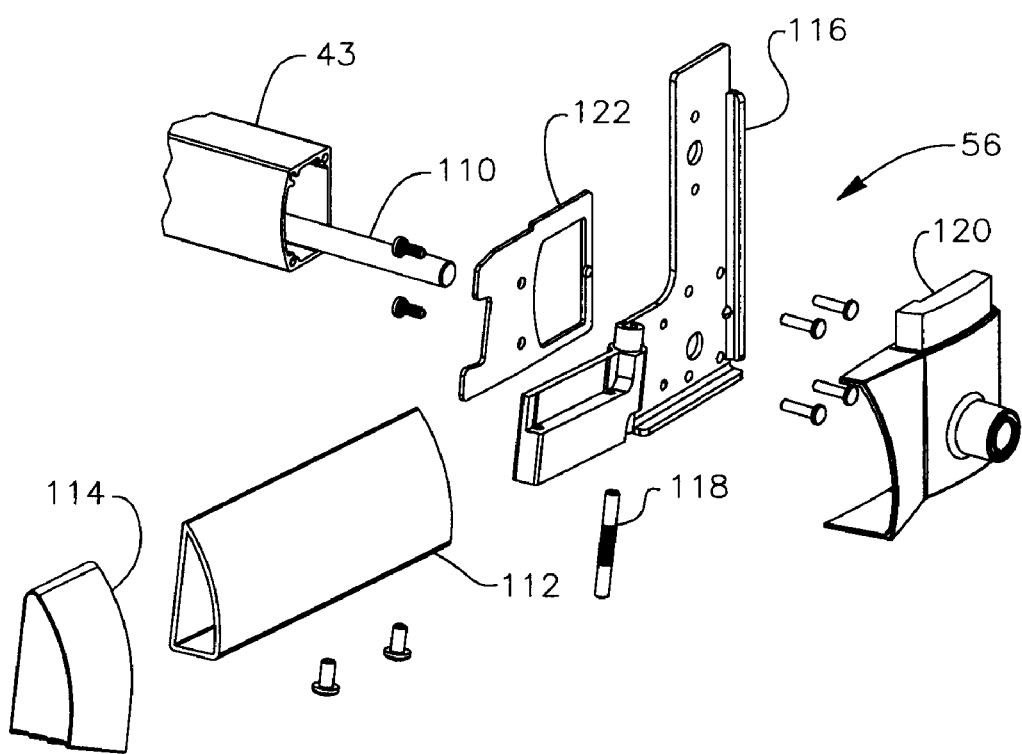
FIG. 16 is an enlarged view of the parts from the right hand side of FIG. 15.

Referring now to FIGS. 15 and 16, various details of the lower carrier subassembly 54 may be seen. As with the upper carrier assembly, because various parts are mirror images between right and left halves, only the left half parts will be described in detail. The lower carrier subassembly 54 includes the lower frame member 43 and an axle 110 connecting the left and right hand sides.

Referring now most particularly to FIG. 16, left foot 28 includes a left foot extrusion 112 and a left foot cap 114. Left foot 28 is connected to a left bracket hinge 116, with a hinge pin 118, and a left bracket outer cover 120 and an inner cover 122. Member 43, foot extrusions 112 and legs 24 may all be formed of aluminum, and foot cap 114 and its counterpart may be formed of a suitable polymer material.

Figure 17:
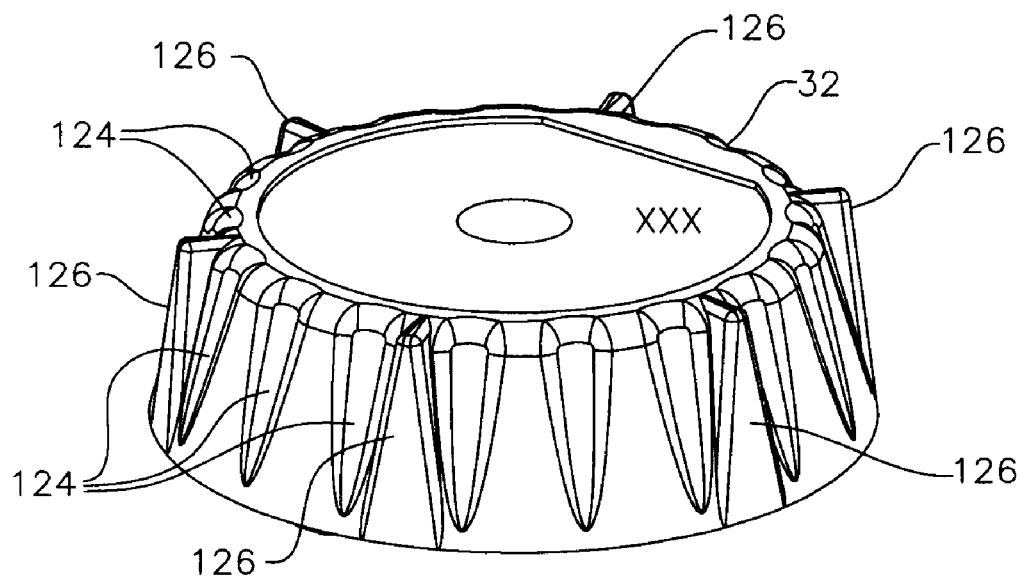
FIG. 17 is a perspective view of the exterior of a cam knob useful in the practice of the present invention.
Figure 18:
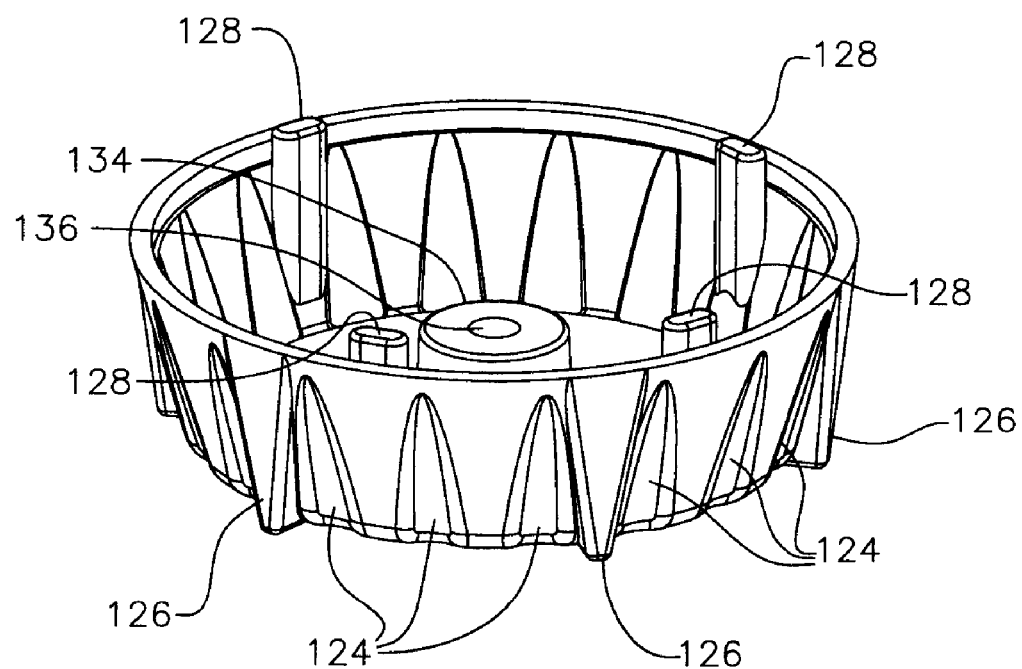
FIG. 18 is a perspective view of the interior of the cam knob of FIG. 17.
Figure 23:
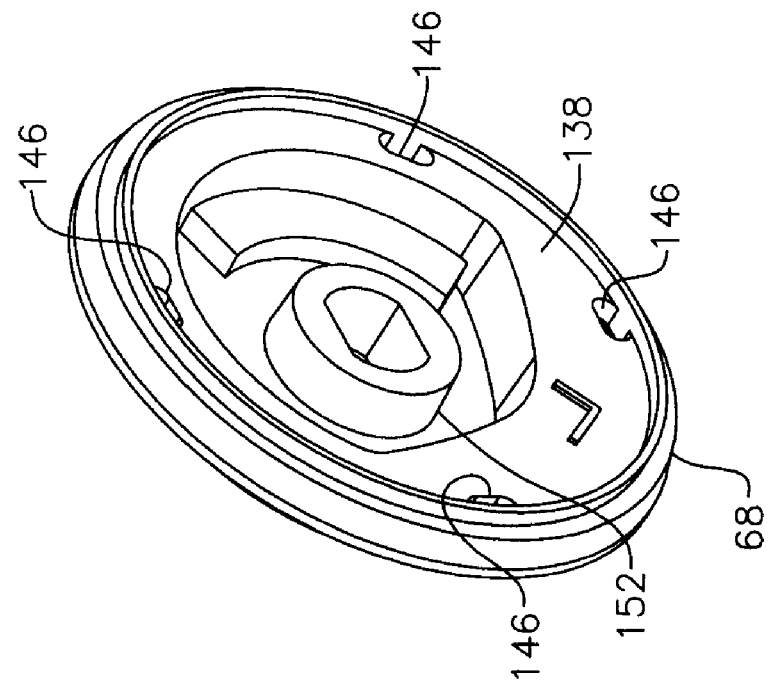
FIG. 23 is a perspective view of a left side cam useful in the practice of the present invention.
Figure 24:
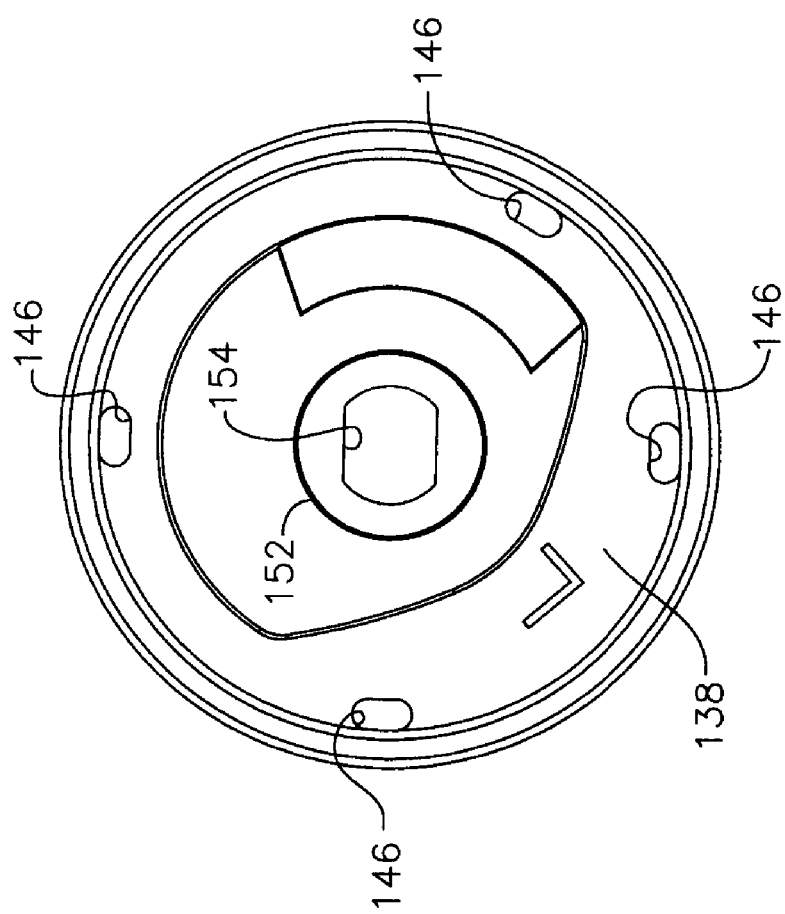
FIG. 24 is a first end view of the left side cam of FIG. 23.
Figure 25:
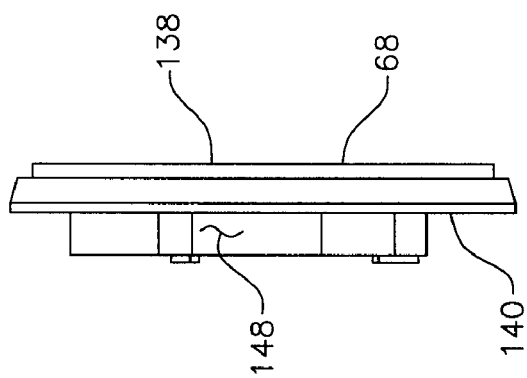
FIG. 25 is a side view of the left side cam of FIG. 23.
Figure 26:
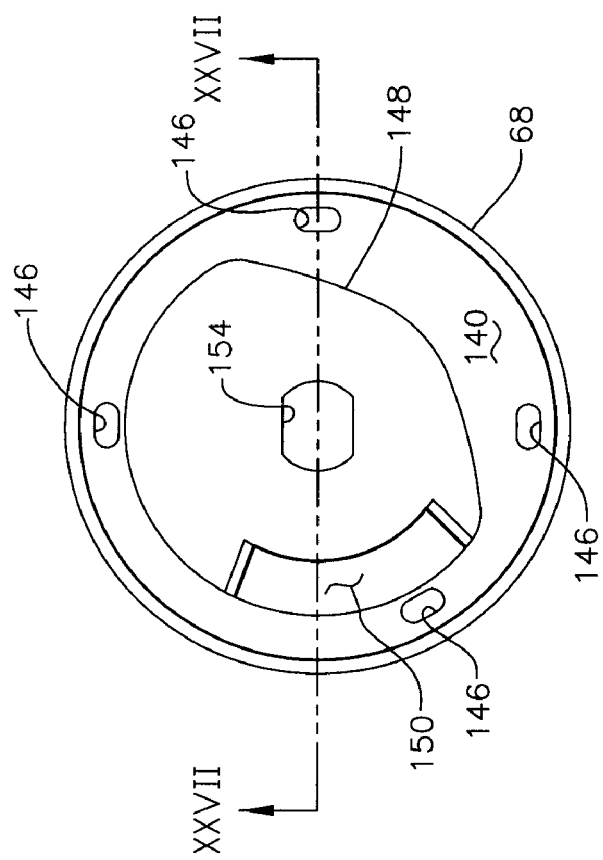
FIG. 26 is a second end view of the left side cam of FIG. 23.
Figure 27:
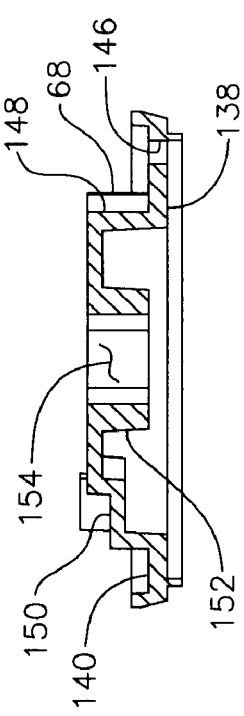
FIG. 27 is a section view taken along line XXVII-XXVII of FIG. 26.
Figure 28:
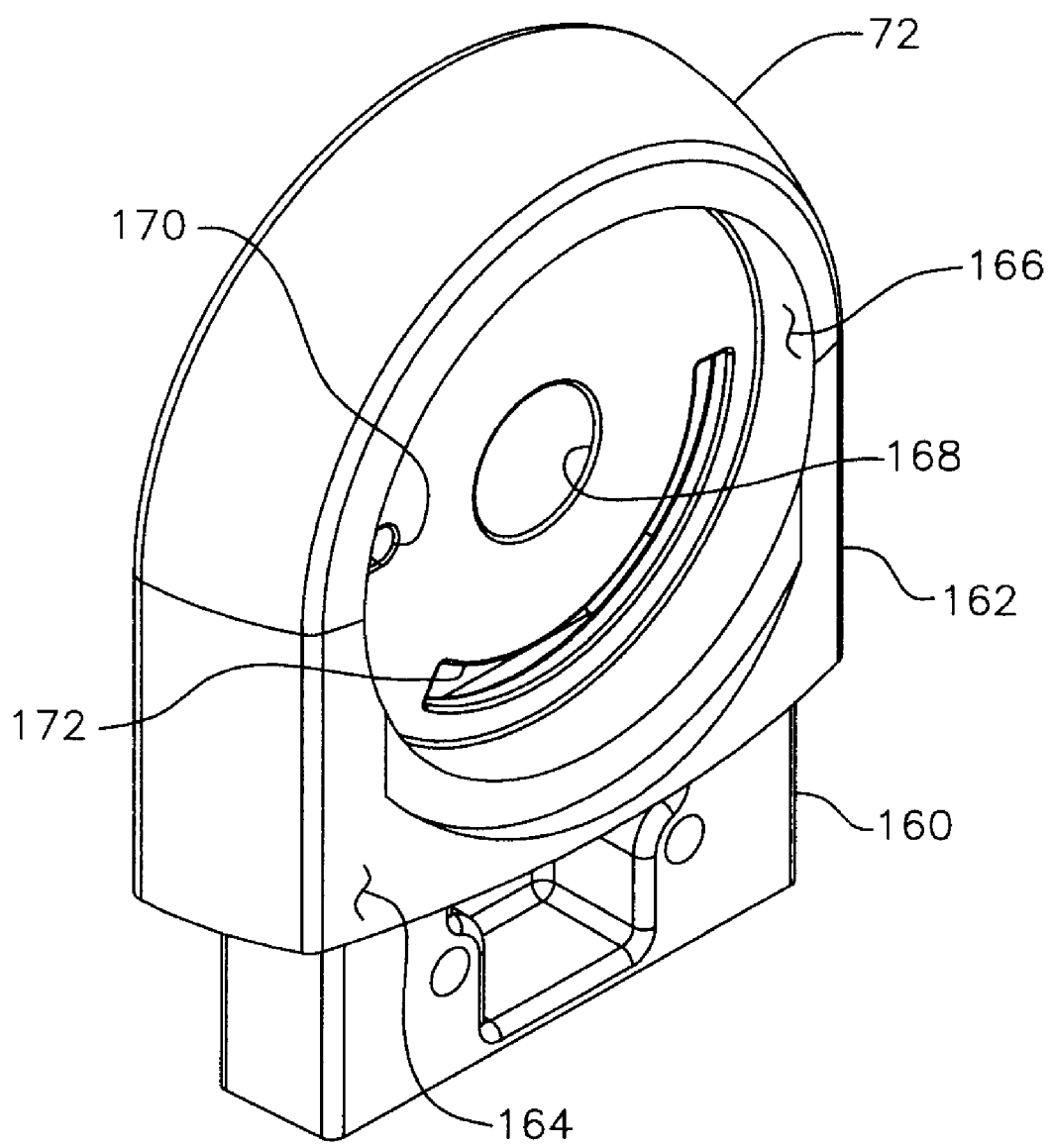
FIG. 28 is a perspective view of a left leg cap die casting useful in the practice of the present invention.
Figure 29:
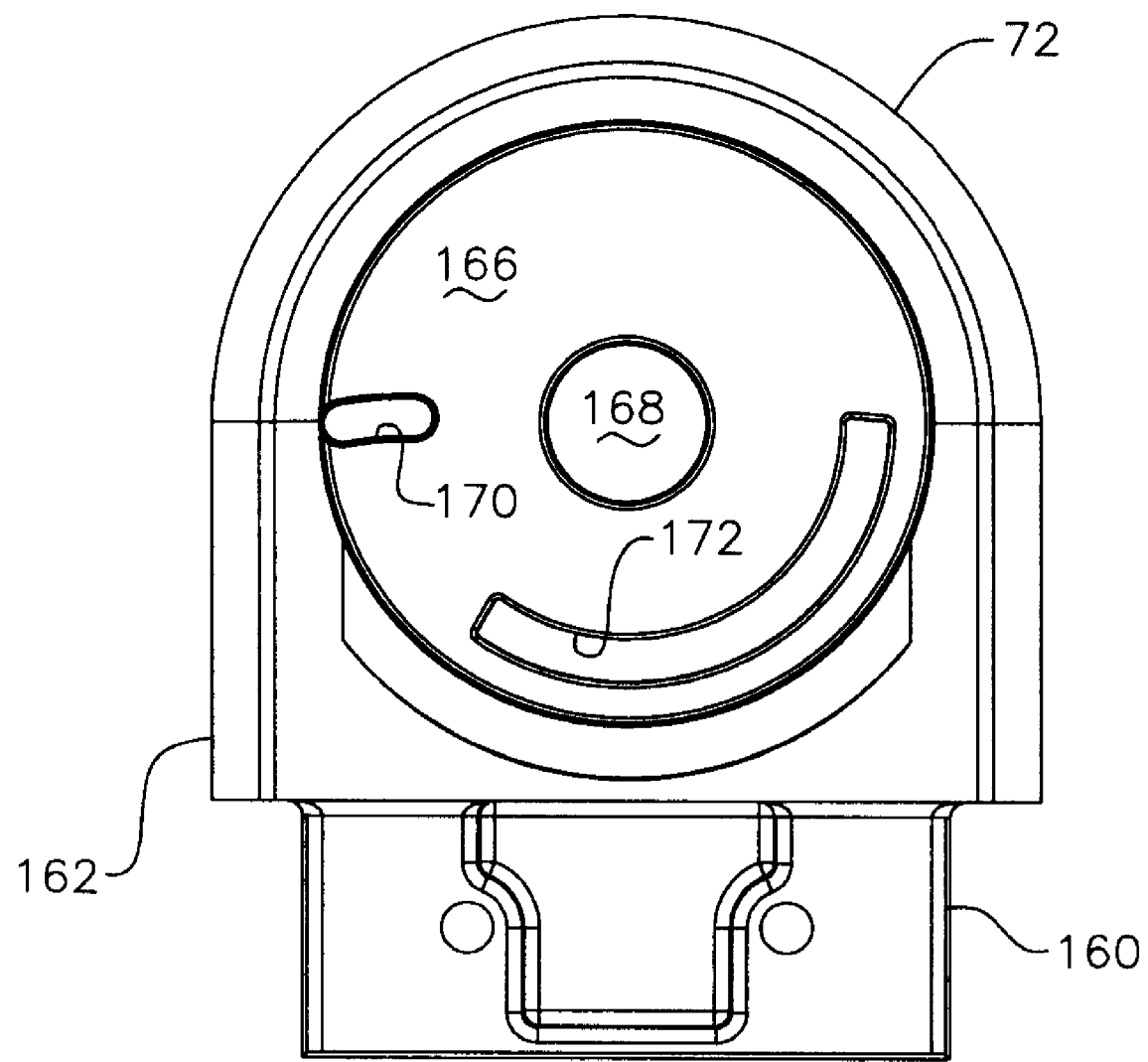
FIG. 29 is a first side view of the leg cap of FIG. 28.
Figure 30:
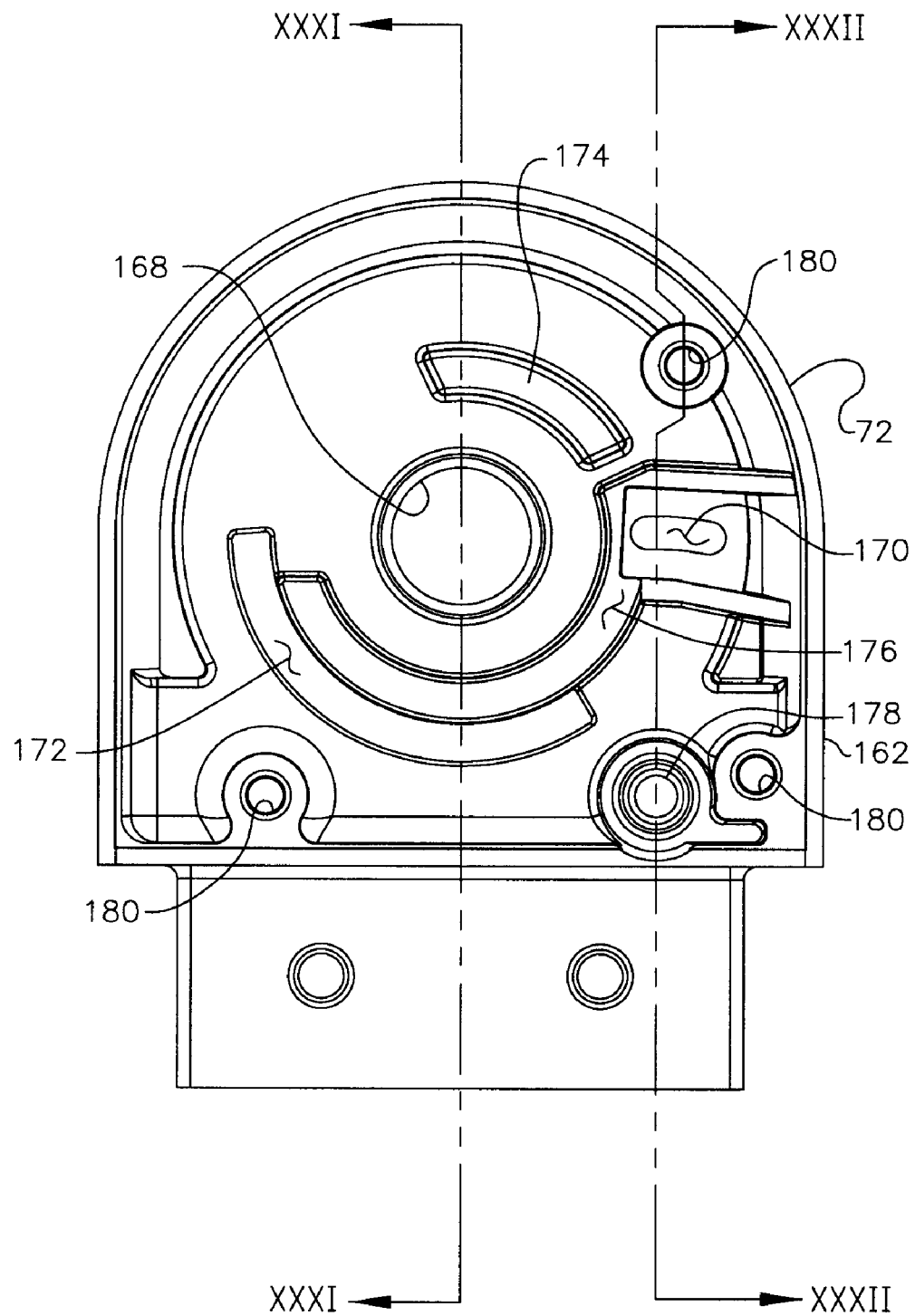
FIG. 30 is a second side view of the leg cap of FIG. 28.

Referring now to FIGS. 17-22, various views of the cam knob 32 may be seen. FIGS. 17 and 18 show, respectively, perspective views of the exterior and interior of the cam knob 32. Knob 32 preferably has a plurality of radially inwardly directed recesses 124 and a plurality of radially outwardly projecting flutes 126 on the exterior of knob 32 to provide a convenient gripping surface for a user. Knob 32 also has a plurality of longitudinally directed projections 128 extending from the interior surface 130. It may be noted that projections 128 are not equidistantly spaced around the circumference of knob 32 so that the knob 32 is keyed to the pawl cam 68. Knob 32 also has a D-shaped recess 132 on the exterior thereof to assist in orienting the knob 32 to the cam 68 during assembly. Knob 32 also has a recessed hub 134 with a through bore 136. Knob 32 may be molded of a suitable polymer, such as polypropylene.

Referring now to FIGS. 23-27, various views of the left pawl cam 68 may be seen. Cam 68 has a first side 138 engaging the cam knob 32 and a second side 140 facing the leg cap 72 for engaging a pin 142 on the pawl 76 and a projection 144 on the handle plate 86. Cam 68 also has a plurality of recesses 146 sized and located to receive the projections 128 of the cam knob 32 during assembly. The pawl cam 68 has a cam surface 148 projecting out of second side 144, and a C-shaped recess 150 in the cam surface 148. Pawl cam 68 also has a hub 152 with a double D shaped aperture 154 therein to mate with and drive or be driven by shaft 62 which has mating flats 155 on each end thereof. Pawl cam 68 may also be made of a suitable polymer, such as polypropylene.

Referring now to FIGS. 28-32, various views of the left leg cap 72 may be seen. The leg caps may be formed of a suitable metal, such as die cast aluminum. Leg cap 72 may have a rectangular base portion 160 to receive the aluminum extrusion forming leg 24. Leg cap 72 may also have an enlarged head portion 162 to serve as a frame or housing for various parts of the lock and release means 30, as will be further described, infra. Head portion 162 has a first side 164 facing and receiving pawl cam 68 in a generally cylindrical recess 166. Leg cap 72 also has a through bore 168 centered in the recess 166. Leg cap 72 also has an elongated oval shaped opening 170 through which pin 142 projects when pawl 76 is assembled to leg cap 72. The elongated opening 170 allows pin 142 to move in a generally radial direction with respect to the recess 166. Leg cap 72 also has an arcuate opening 172 through which the projection or tang 144 of handle plate 86 extends when the left hand portion 58 of the lock and release means 30 is assembled. Leg cap 72 also has a pair of arcuate lands 174, 176 partially circumferentially surrounding bore 168. Lands 174 and 176 aid in retaining the large spring 74 when received in leg cap 72 and during operation of the lock and release means 30. Leg cap 72 also has a cylindrical boss 178 sized and positioned to receive pawl 76, pawl spring 78 and pawl bushing 80. Leg cap 72 may also have threaded blind bores 180 to receive fasteners 88 to secure the cap plate 82 to the leg cap 72 and retain the parts located therebetween.

Figure 33:
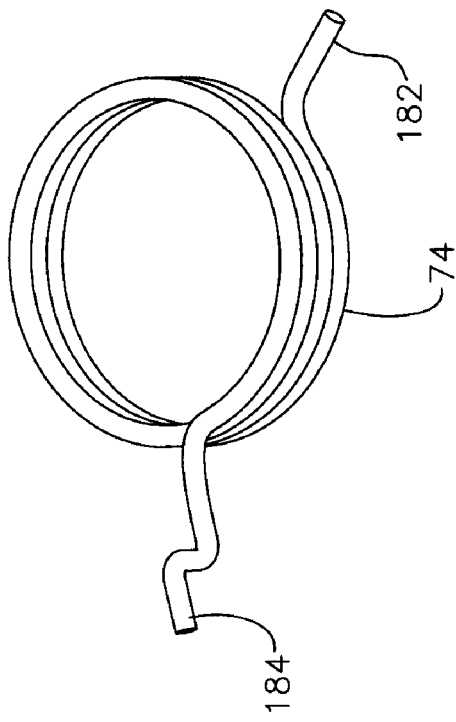
FIG. 33 is a perspective view of a large spring useful in the practice of the present invention.
Figure 34:
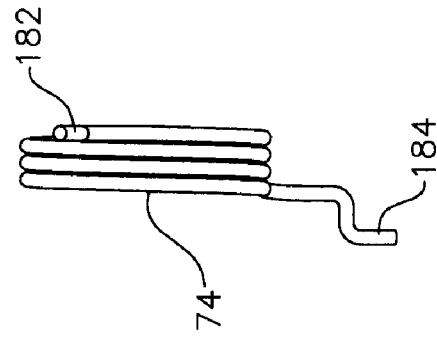
FIG. 34 is a side elevation view of the spring of FIG. 33.
Figure 35:
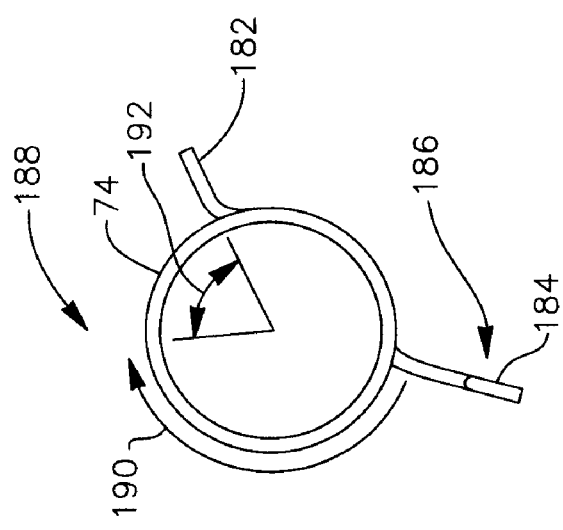
FIG. 35 is a top plan view of the spring of FIG. 33.

Referring now to FIGS. 33-35, various views of the large spring 74 may be seen. Spring 74 has a radially projecting first end 182 and an offset radially projecting second end 184, shown in a relaxed state at position 186, and in a fully loaded position 188 when the first end 182 is fixed and the second end is rotated in the direction of arrow 190. Spring 74 preferably has a torque of 7.9 in-lb at position 188 at angle 192 of about 70 degrees.

Referring now to FIGS. 36-38, various views of the pawl spring 78 may be seen. Spring 78 has a tangentially projecting first end 194, and a generally radially projecting and bent second end 196. When deflected through an angle 198 of about 33.6 degrees with the first end fixed, the torque on the second end is preferably about 0.23 in-lbs.

Referring now to FIGS. 39-41, various views of the pawl 76 may be seen. Pawl 76 has an arm 200 with a ring 202 formed at one end and a head 204 formed at the other end. As best seen in FIGS. 39 and 41, pin 142 projects in one direction away from arm 200 and head 204 projects from arm 200 in the opposite direction. Pawl 76 is preferably formed of metal, such as steel. Pin 142 may be a dowel pin pressed into a bore in an interference fit with head 204.

Figure 42:
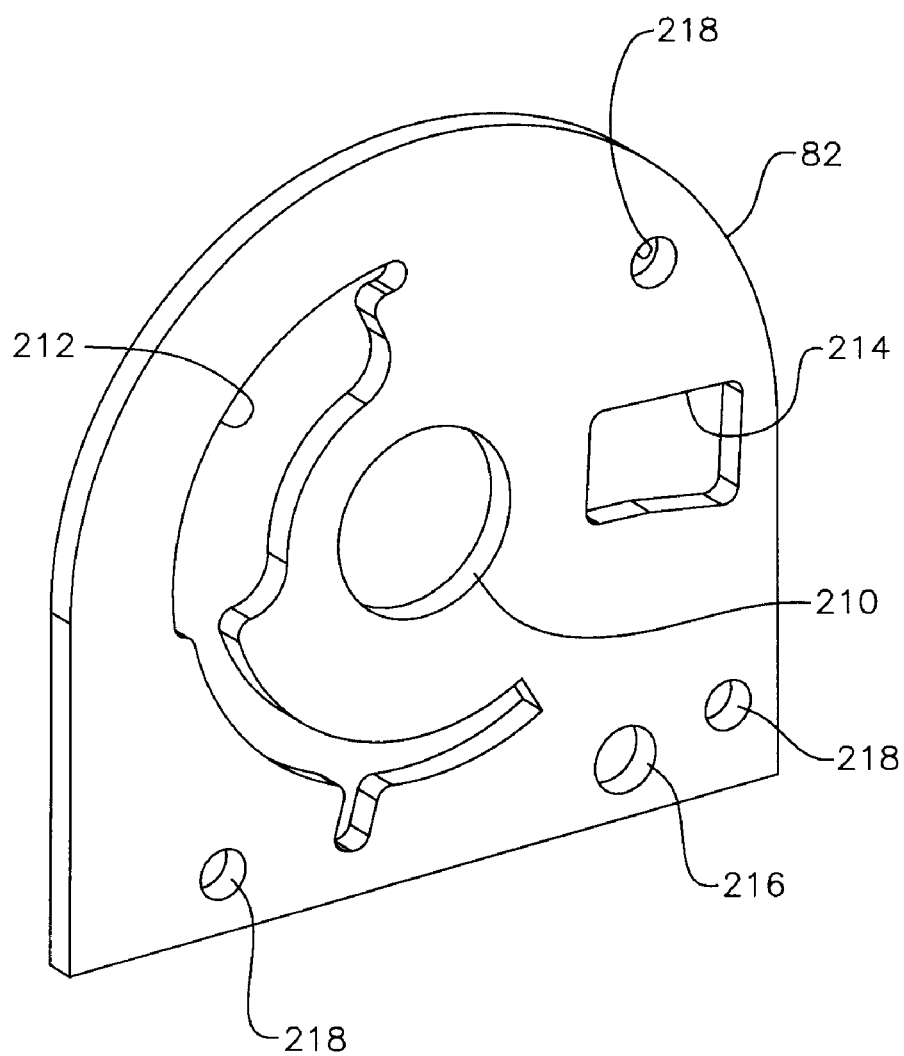
FIG. 42 is a perspective view of a cam plate useful in the practice of the present invention.
Figure 44:
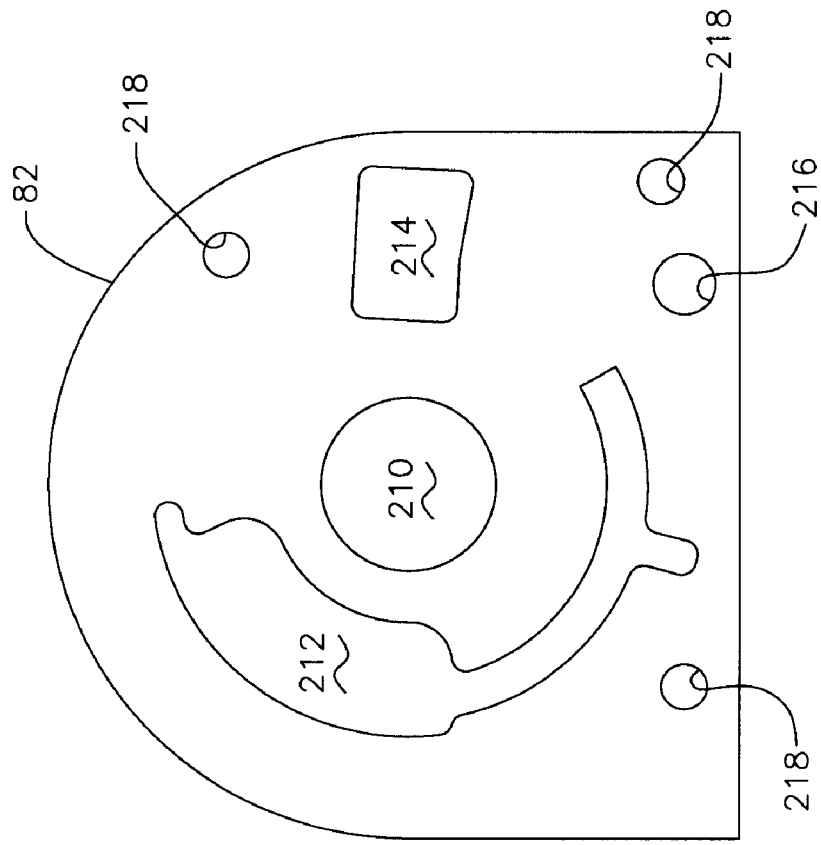
FIG. 44 is a side plan view of the cam plate of FIG. 42.
Figure 43:
FIG. 43 is an end view of the cam plate of FIG. 42.
Figure 45:
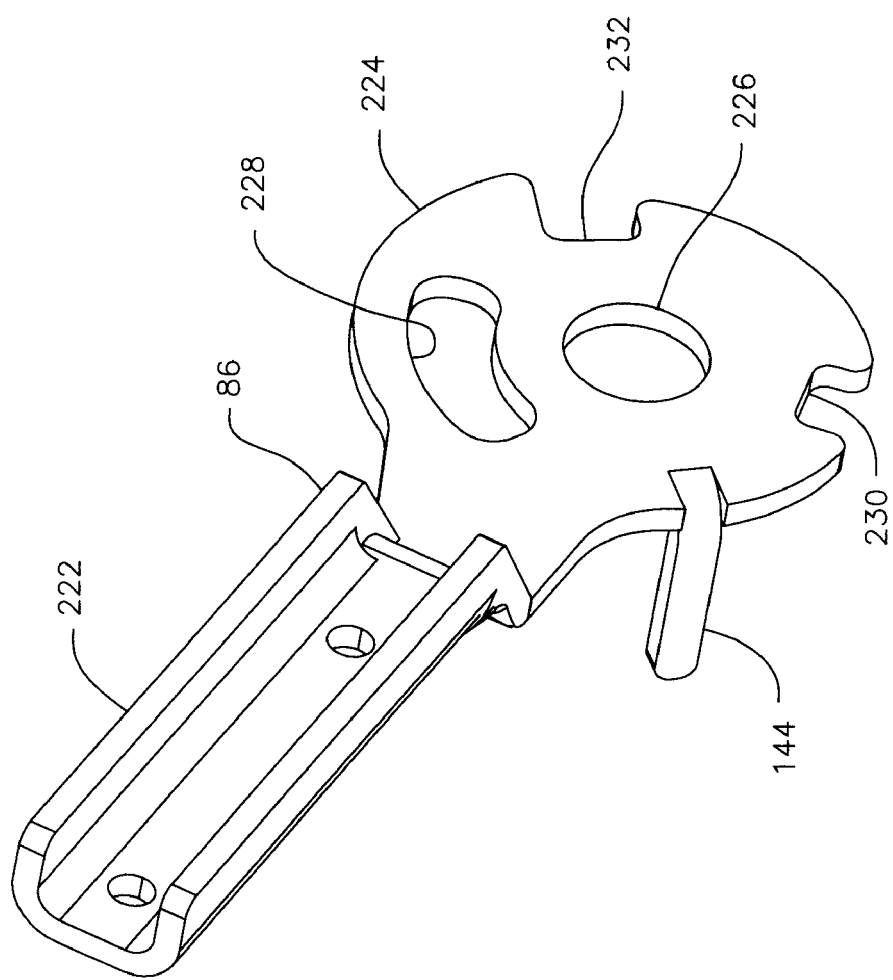
FIG. 45 is a perspective view of a left handle plate useful in the practice of the present invention.
Figure 49:
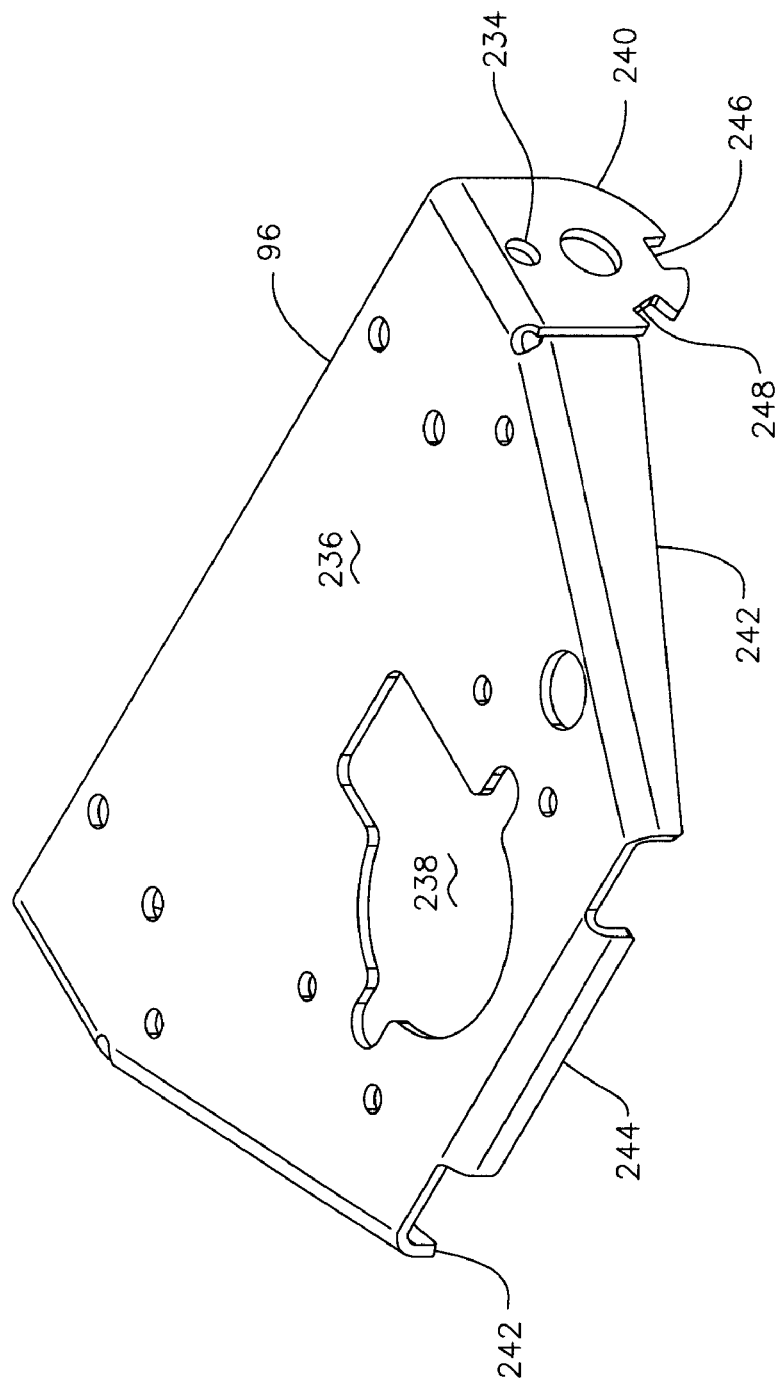
FIG. 49 is a perspective view of a pump support plate useful in the practice of the present invention.
Figure 51:
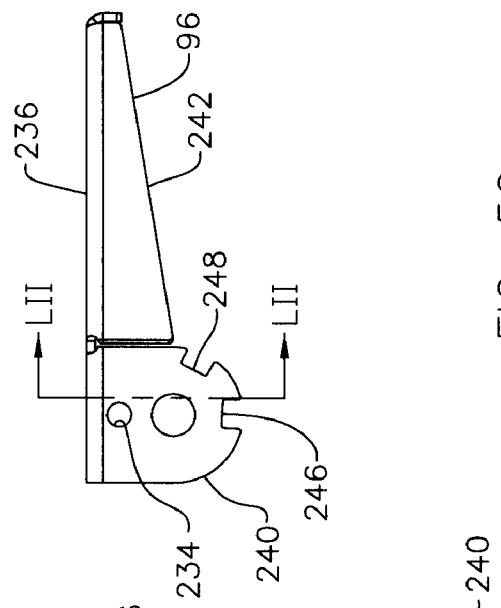
FIG. 51 is a side elevation view of the pump support plate of FIG. 49.
Figure 52:
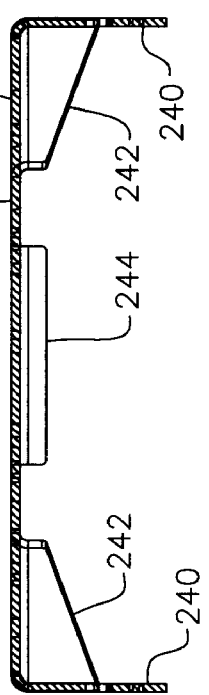
FIG. 52 is a section view taken along line LII-LII of FIG. 51.
Figure 50:
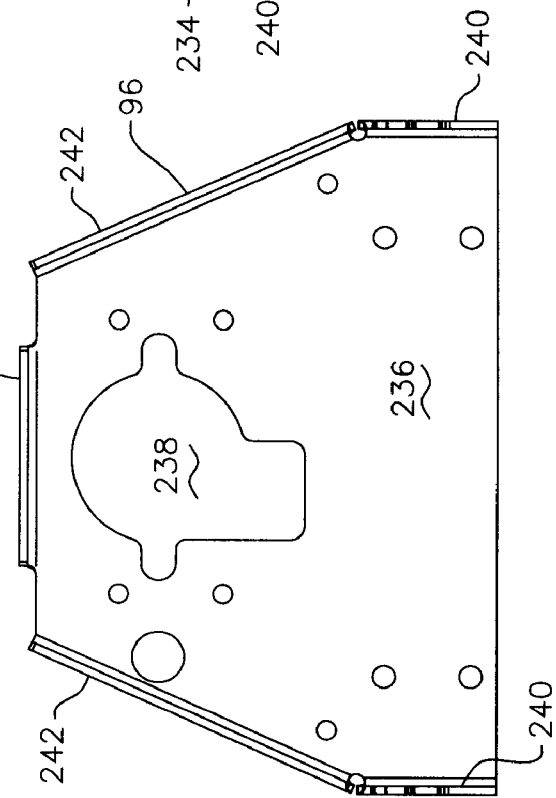
FIG. 50 is a top plan view of the pump support plate of FIG. 49.

Referring now to FIGS. 42-44, various views of the cap plate 82 may be seen. Cap plate 82 is preferably formed of 11 gauge cold rolled steel and has a central through bore 210, a C-shaped aperture 212, a generally rectangular aperture 214, a cylindrical aperture 216 (for boss 178 of leg cap 72), and three holes 218 (for fasteners 88). Central bore 210 is sized to receive shaft 62. C-shaped aperture 212 permits entry of a pin 220 (on plate 96) and tang 144 (of handle plate 86) through cap plate 82 and also permits limited arcuate movement thereof. Aperture 214 permits entry of head 204 of pawl 76 through plate 82, and permits limited radial movement thereof.

Referring now to FIGS. 45-48, various views of the handle plate 86 may be seen. Handle plate 86 has a channel shaped extension 222 sized to be received in handle 20. Handle plate 86 also has a flat paddle like portion 224 with a central through bore 226 (to allow shaft 62 to pass therethrough), an arcuate aperture 228 (to allow pin 220 of plate 96 to project therethrough), and a pair of rectangular notches 230, 232, in addition to having tang 144 project perpendicularly from portion 224. Handle plate 86 may be formed of metal, such as 11 gauge cold rolled steel.

Figure 53:
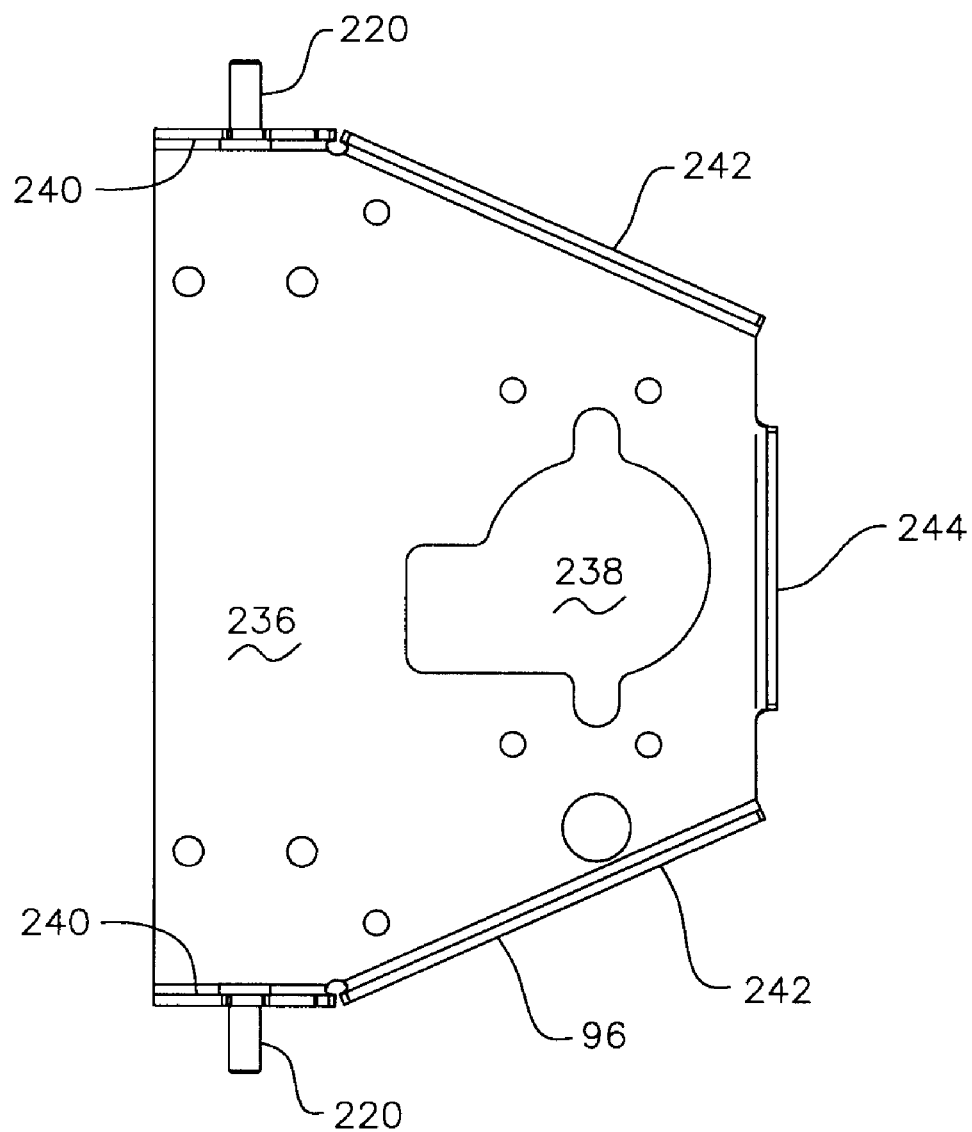
FIG. 53 is a bottom plan view of the pump support plate of FIG. 49 with a pair of posts installed therein.

Referring now to FIGS. 49-53, various views of the pump support plate 96 may be seen. Plate 96 is preferably formed of 11 gauge cold rolled steel, and has a pair of pins 220 received through apertures 234 and welded in place, as shown in FIG. 53. Plate 96 has a generally horizontal section 236 with a cutout 238 to allow the fluid section 16 of the pump 14 to project therethrough, and has side plates 240 formed integrally therewith. Plate 96 may also have side gussets 242 and a front stiffening fold 244 to reinforce the stiffness of the plate 96. Each side plate 240 has a pair of notches 246, 248.

Figure 54:
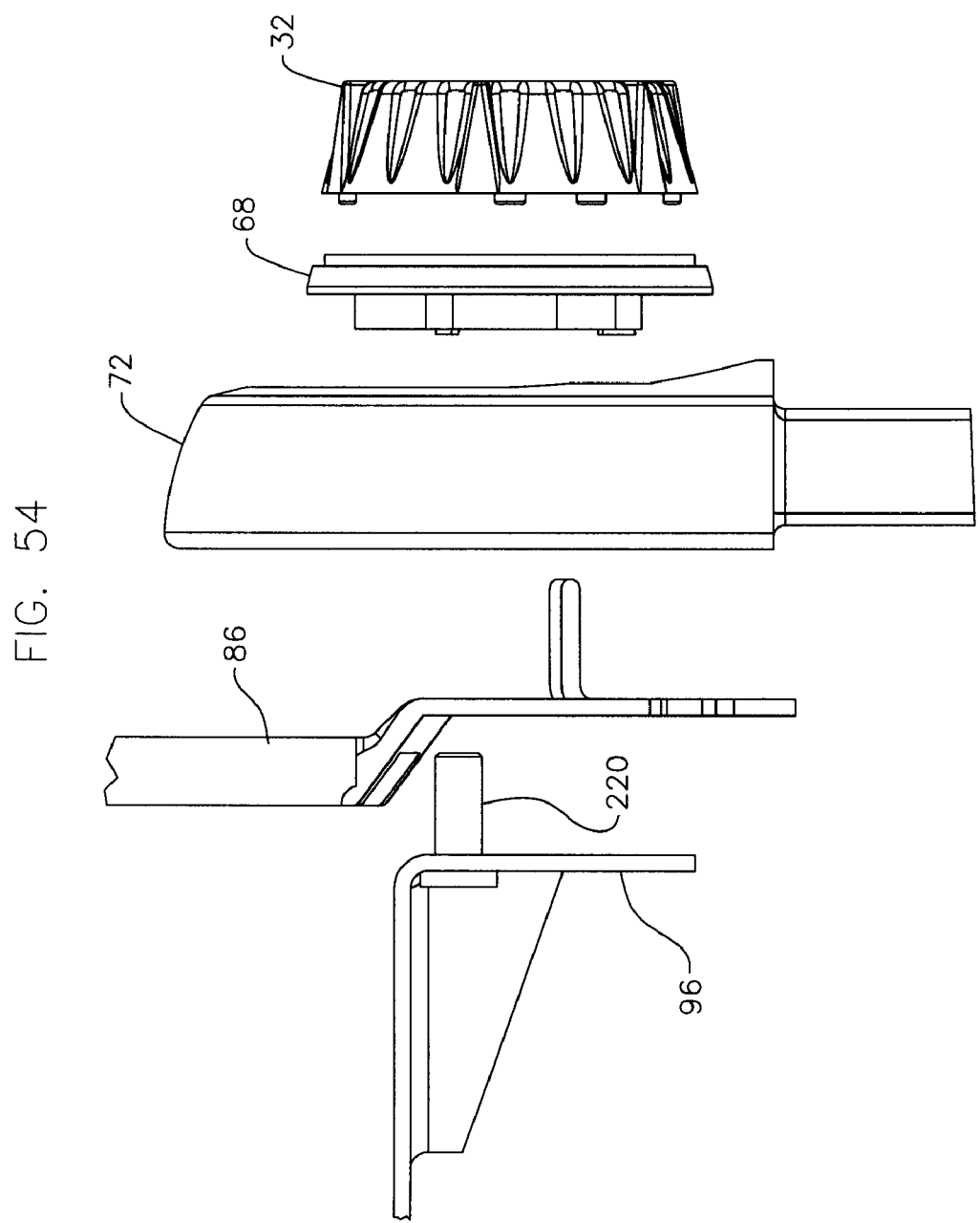
FIG. 54 is a fragmentary exploded view of a hub assembly to illustrate certain aspects of the present invention.

Referring now to FIG. 54, a fragmentary exploded view of a left side of the support plate 96, left handle plate 86, left leg cap 72, left pawl cam 68 and cam knob 32 may be seen. This view illustrates the relationship of these parts and indicates the manner of assembly thereof.

Figure 55:
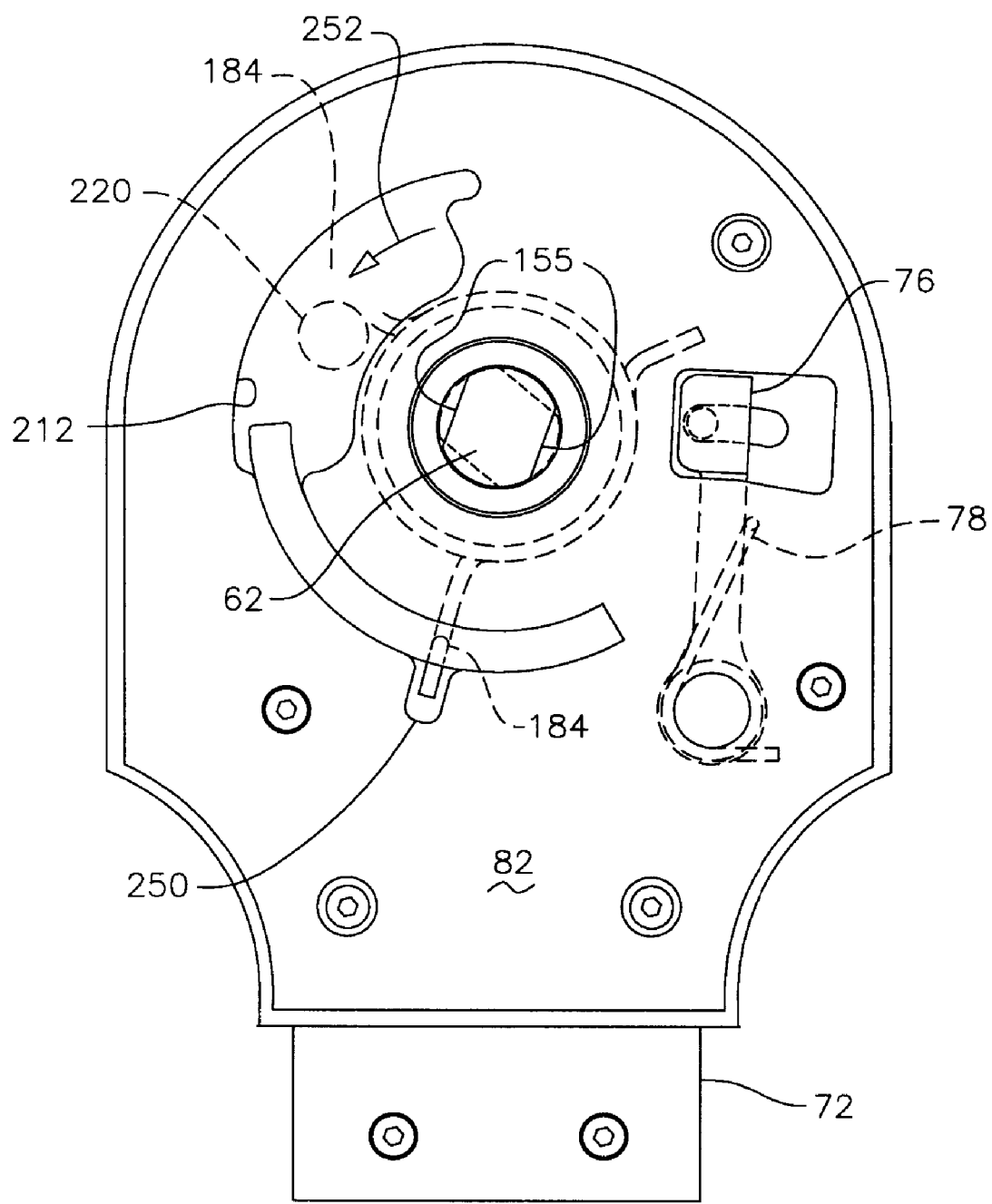
FIG. 55 is a side view of certain parts of the hub assembly showing certain parts to illustrate certain aspects of the present invention.

Referring now to FIG. 55, a subassembly of the left leg cap 72 and cap plate 82 is illustrated, along with the end of shaft 62, and springs 74 and 78 and pawl 76 to illustrate certain aspects of the present invention. Pin 220 is shown in phantom to illustrate its relation to the other parts, in particular to the C-shaped aperture 212 and the spring 74. The offset second end of spring 74 may be received in a radial notch 250 during assembly and thereafter the second end of spring 74 will extend out of aperture 212 and overlap cap plate 82. When second end 184 of spring 74 moved to be adjacent pin 220, it will urge pin 220 in the direction of arrow 252. Spring 78 urges pawl 76 to the position shown in FIG. 55.

Figure 56:
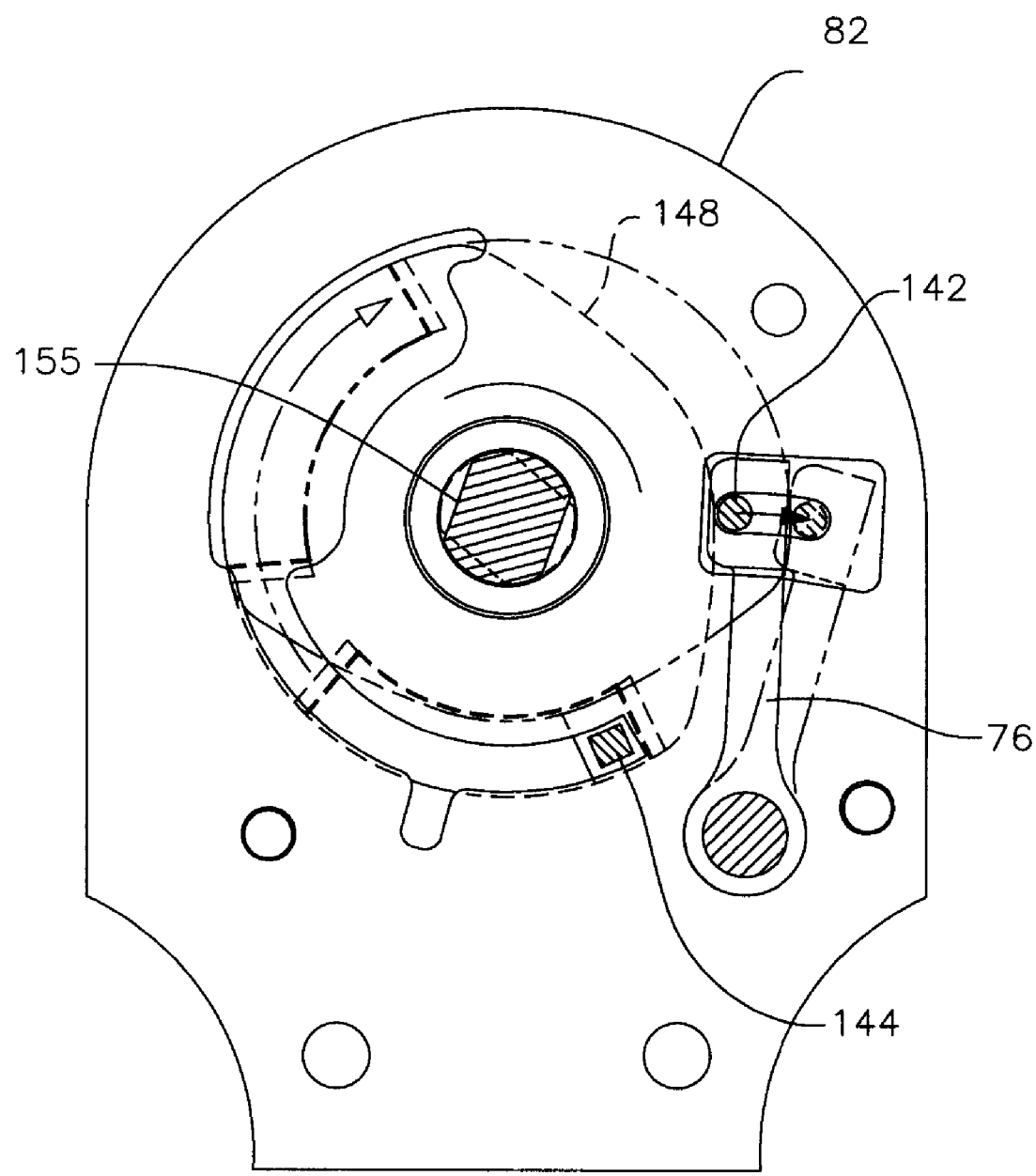
FIG. 56 is a view similar to that of FIG. 55 except showing other parts to illustrate certain aspects of the present invention.

Referring now to FIG. 56, a simplified overlay view of the left cap plate 82, left pawl cam 68 and left pawl 76 may be seen. In this view, cam 68 and pawl 76 are shown in solid lines to illustrate the condition where the lock and release means is locking the cart assembly 10 in one of the first and second positions 12, 36. The chain line positions for cam 68 and pawl 76 illustrate the condition where cam knob has been rotated to rotate the cam from the position shown in solid lines and where the cam surface 148 has driven the pawl 76 (via pin 142) to a release condition where the handle 20 of the cart assembly 10 may be moved between the first and second positions 12 and 36. When one cam knob 32 is rotated, it will rotate shaft 62 via flats 155 to rotate the cam on the other side of the cart. In FIG. 56, the tang 144 is shown in the position it would be when the handle 20 is in the second or storage position 36.

Figure 57:
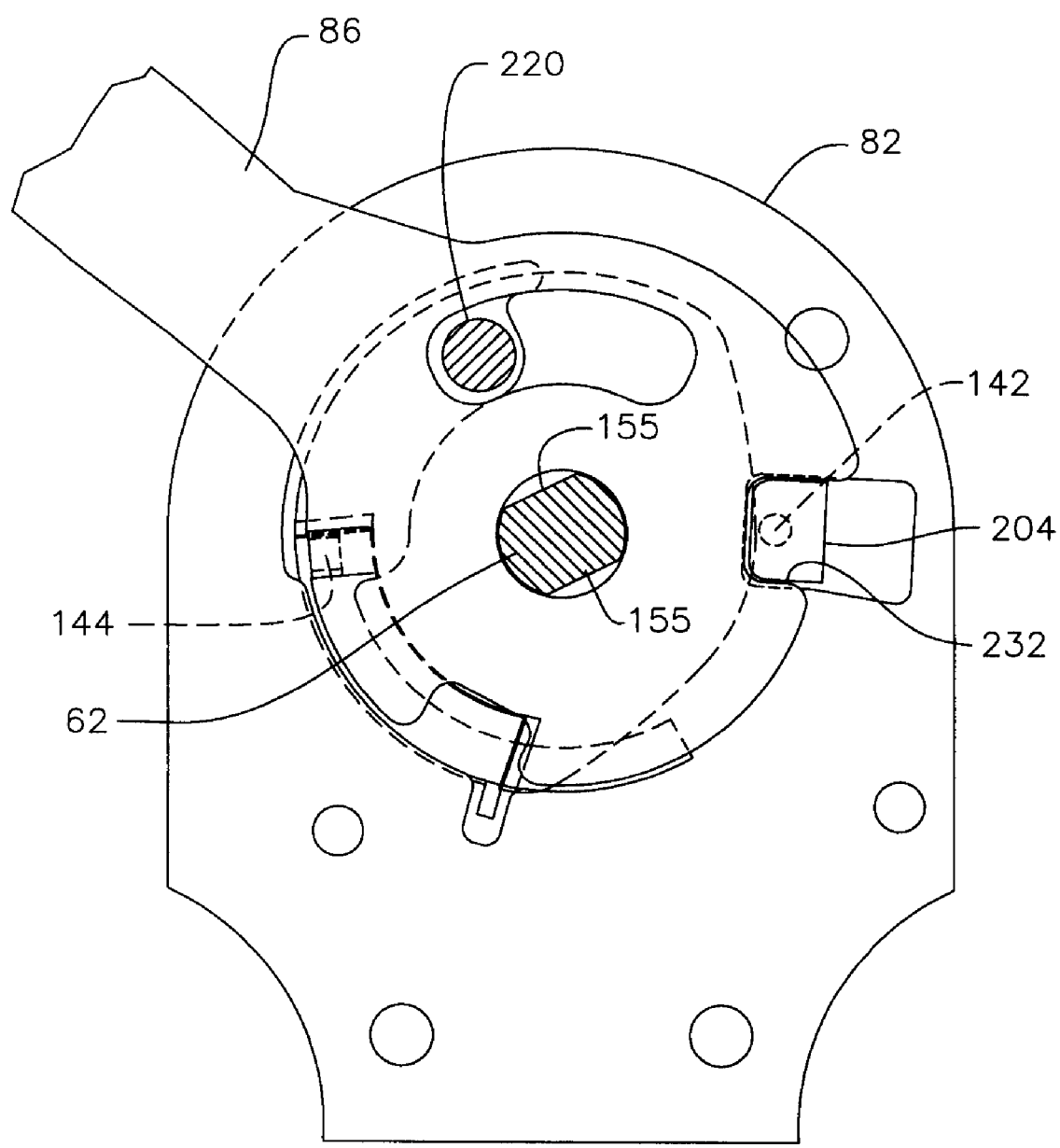
FIG. 57 is a view similar to that of FIG. 55 except including the handle plate to illustrate certain aspects of the present invention.

Referring now to FIG. 57, the cap plate 82 is shown with a portion of the pawl 76 in the locked condition, and with the left handle plate 86 in the first or operating position 12 for handle 20. Note that the head 204 of pawl 76 is engaged with notch 232 of handle plate 86 in this condition. In this view, pin 220 of support plate 96 may also be seen to be constrained by one end of the C-shaped aperture 212 in cap plate 82 and also by the arcuate aperture 228 in the handle plate 86. These apertures provide a lost motion engagement mechanism between the handle 20 and the pump support 26 which allows the handle 20 to rotate from the first position 12 to the intermediate position 34 without rotation of the pump support 26 from the first position 12.

Figure 58:
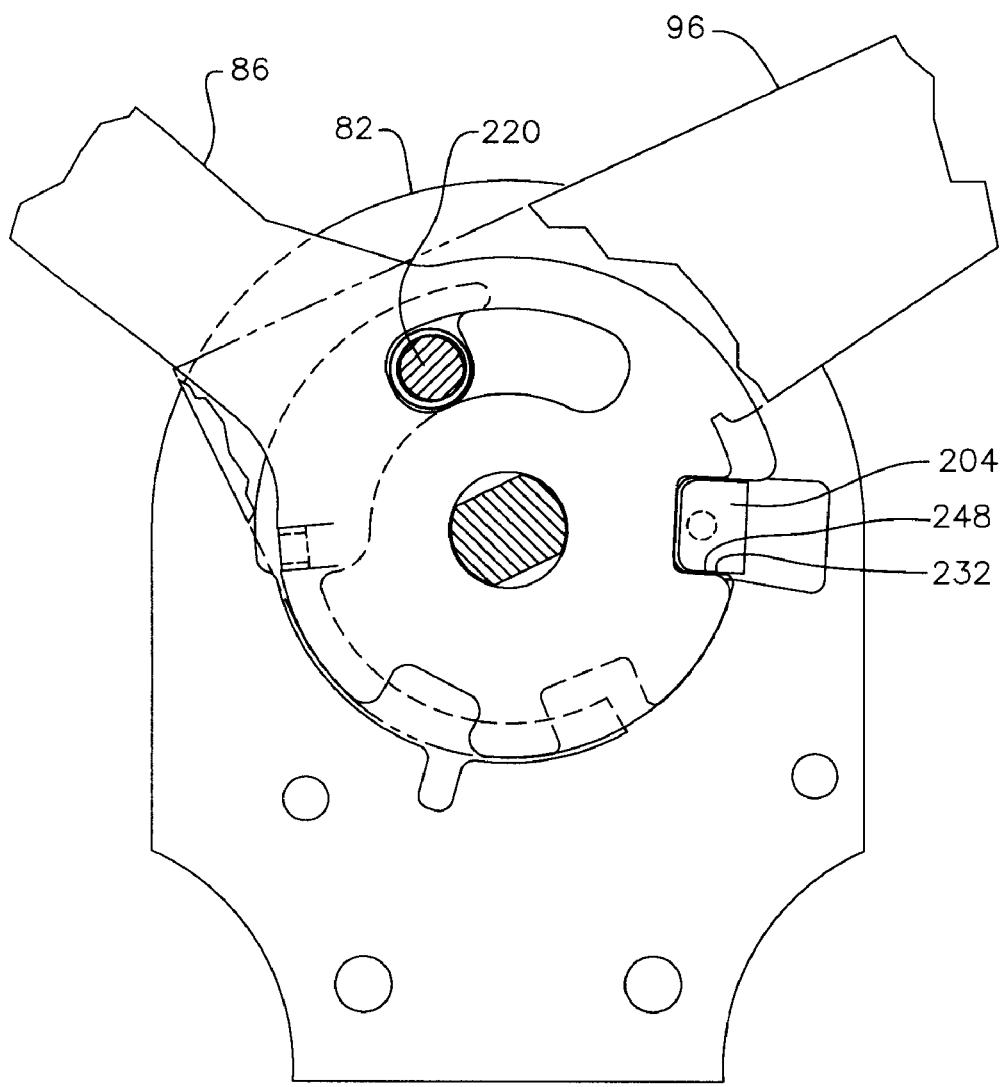
FIG. 58 is a view similar to that of FIG. 57 except including a fragmentary cutaway view of the pump support plate in a first position to illustrate certain aspects of the present invention.

In FIG. 58, the support plate 96 has been added, and it may be observed that notch 248 is also engaged with head 204 of pawl 76 in the position shown, which is still indicative of the first or operating position 12 for cart 10.

Figure 59:
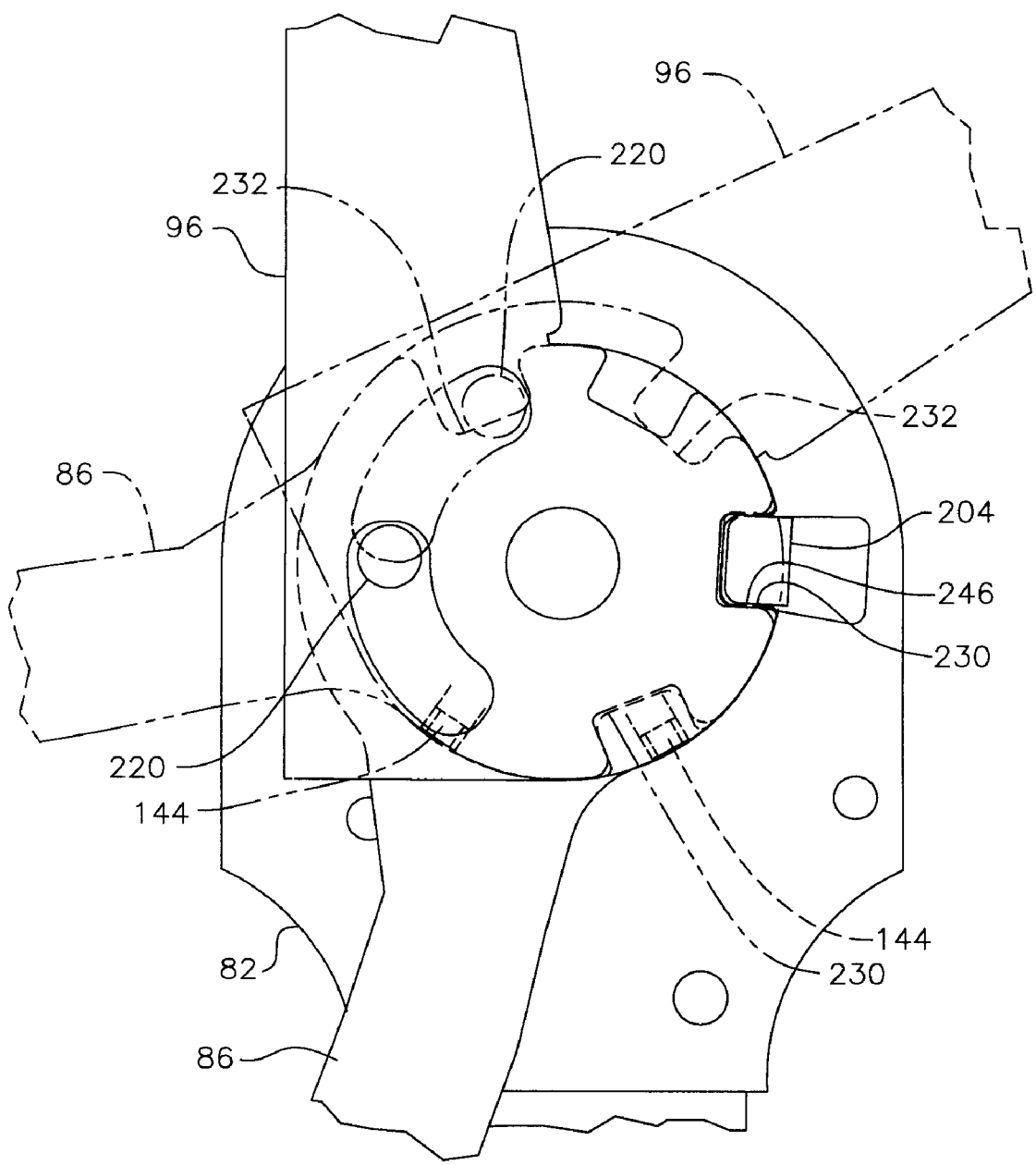
FIG. 59 is a view similar to that of FIG. 58, except showing the handle plate and pump support plate in a second position, with the first position of these parts shown in phantom.
Figure 60:
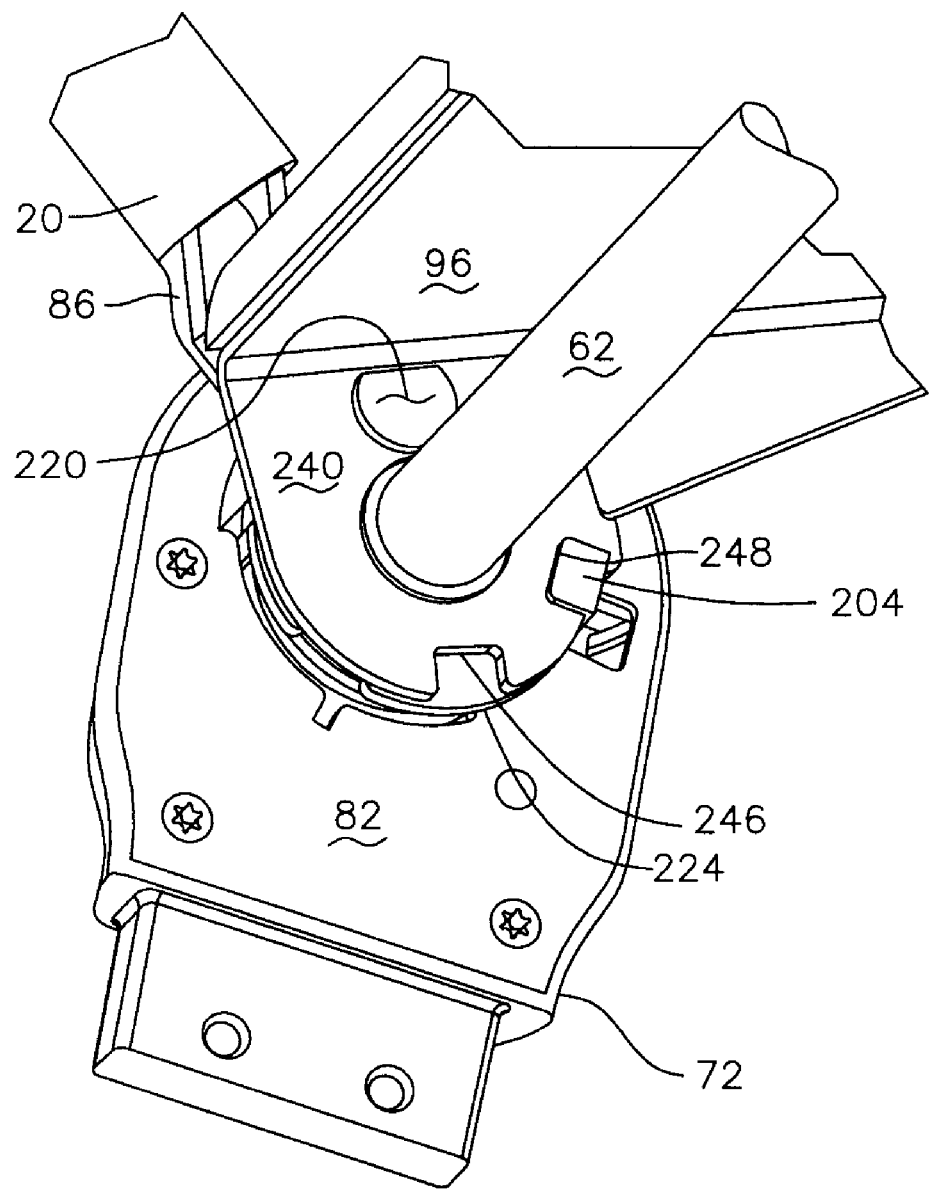
FIG. 60 is a fragmentary perspective view of the parts shown in FIG. 58 from below showing parts in the first position.

FIG. 59 shows the handle plate 86 and the support plate 96 in solid lines in the storage position 36. The chain lines indicate parts in the operating position 12, for reference. It is to be noted that both notch 230 in handle plate 86 and notch 246 in support plate 96 are engaged with head 204 of the pawl 76 when parts are in the storage or second position 36, corresponding to FIGS. 7, 8 and 9 when the handle 20 is fully collapsed or folded against the cart.

Figure 61:
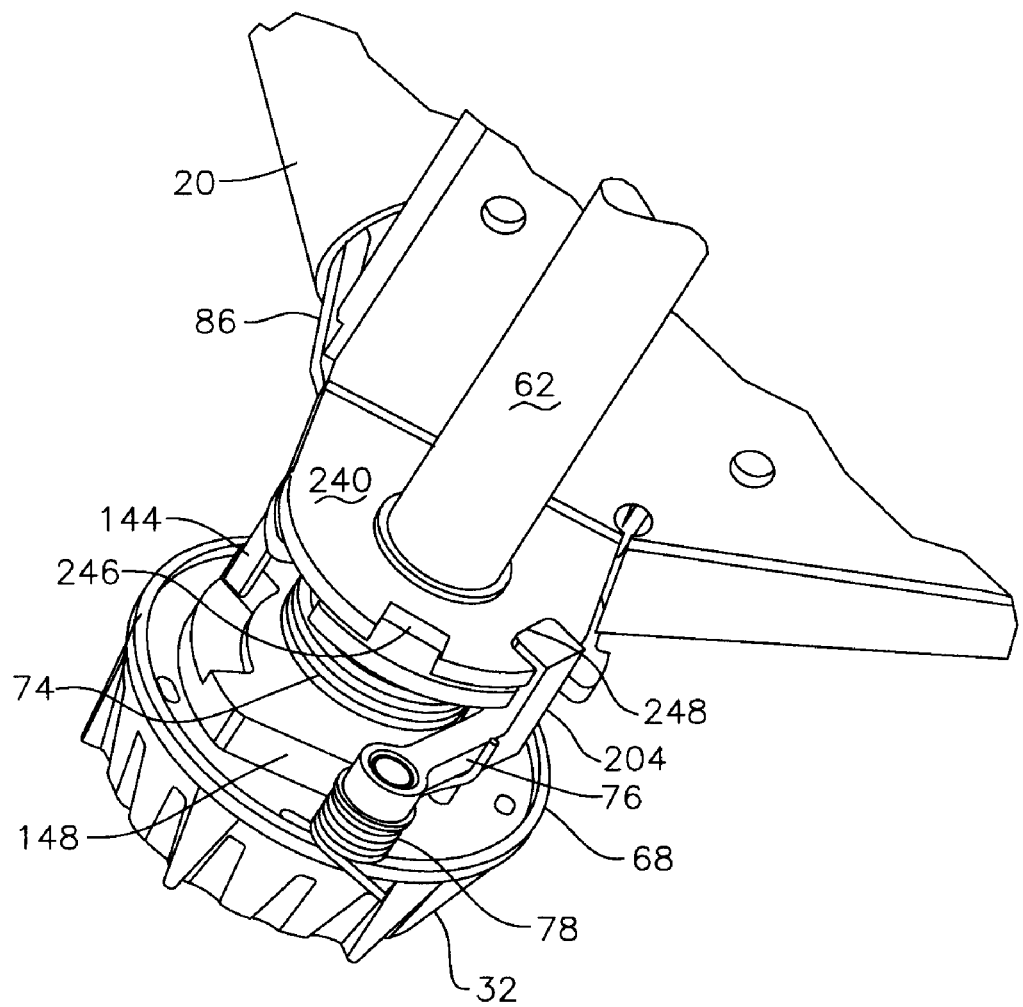
FIG. 61 is a view similar to that of FIG. 60, except with the leg cap and cap plate omitted to better illustrate the relationship of the parts illustrated.
Figure 62:
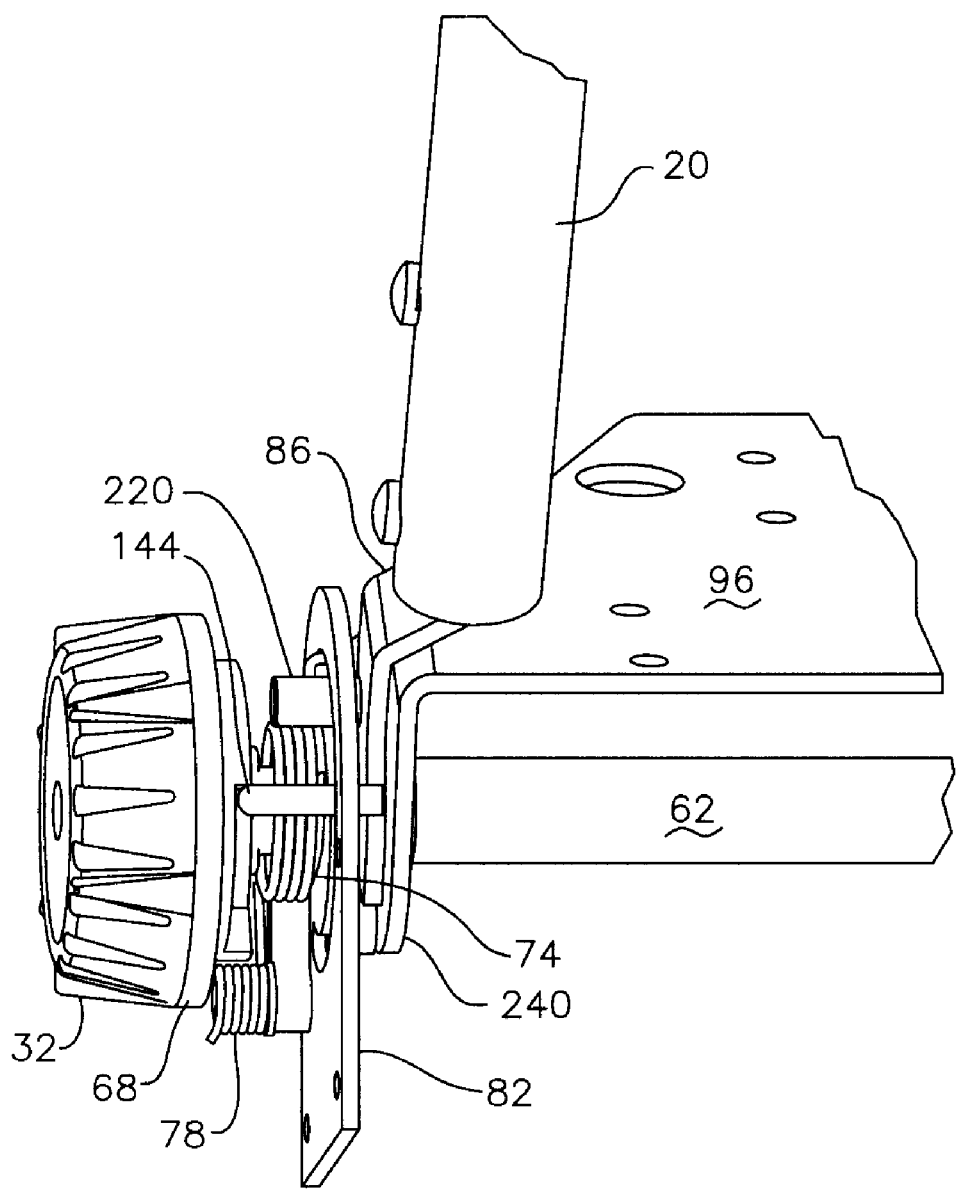
FIG. 62 is a view of the parts shown in FIG. 61, except from the rear and above the cart, but with the cap plate included.
Figure 63:
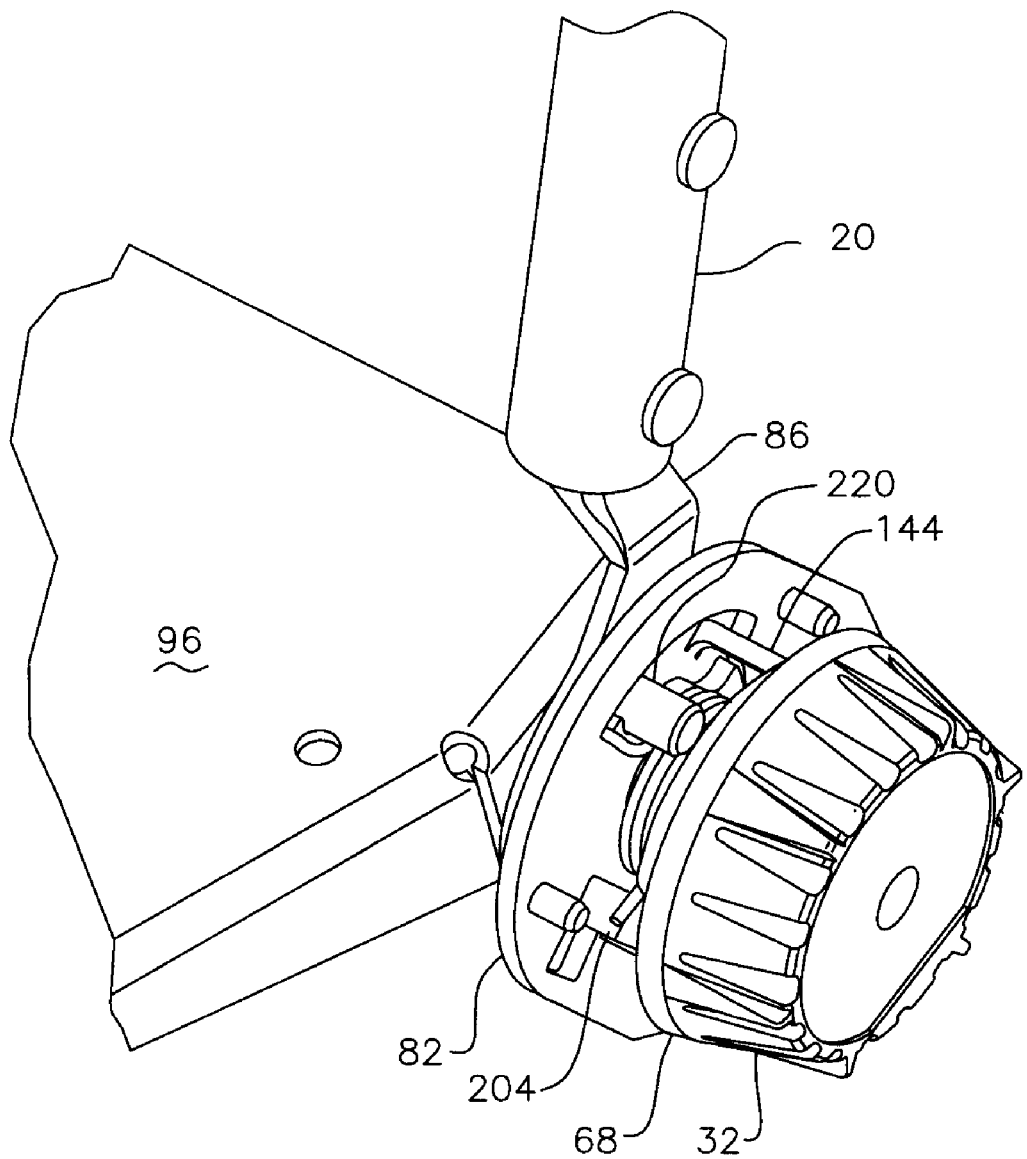
FIG. 63 is a view of the parts as shown in FIG. 62, except from the front and above the cart.

FIGS. 60-63 show various close-up perspective views of parts of the lock and release means 30, with parts in the operating position 32, and with the leg cap 72 omitted from FIGS. 61-63, and with the cap plate 82 removed from FIG. 61 to better show the relationship of the remaining parts.

From the above, it may thus be seen that the lock and release means 30 automatically locks the handle 20 and pump support 26 in the second position 36 as the handle 20 is rotated from the intermediate position 34 to the second position 36. Similarly it can be seen that the lock and release means 30 automatically locks the handle 20 and pump support 26 (which includes plate 96) in the first position 12 as the handle 20 is rotated from the intermediate position 34 to the first position 12.

In the method aspect of the present invention, the method includes operating a collapsible cart assembly according to the steps of unlocking the handle on the collapsible cart assembly by rotating the hub on the assembly to release the handle for rotation; rotating the handle about the hub from the operating position to the intermediate position; continuing rotating the handle about the hub from the intermediate position to the storage position; and locking the handle in the storage position. The method may further include driving the pump support on the cart assembly from the operating position to the storage position when the handle moves from the intermediate position to the storage position.

The method may further include the additional steps of unlocking the pair of feet attached to the cart assembly by rotating the locking bail from the locked position intermediate the feet to the unlocked position out of the path of the feet; storing the feet by rotating the feet from the operating position towards the cart assembly to the storage position; and locking the feet in the storage position by rotating the locking bail from the unlocked position to the locked position wherein the bail retains the feet in the storage position.

This invention is not to be taken as limited to all of the details thereof as modifications and variations thereof may be made without departing from the spirit or scope of the invention.

The invention claimed is:

1. A collapsible cart assembly for a paint spray pump comprising:
   a) a pair of spaced apart legs, each extending from a lower end to an upper end;
   b) a pump support extending between the upper ends of the legs;
   c) a pair of feet, with one foot associated with each leg at the lower end thereof;
   d) a handle extending above the pump support; and
   e) lock and release means connected to the handle, pump support and legs and operable for releasably locking the pump support and handle in a first position wherein the pump support positions the pump for operation and the handle is positioned to enable moving the cart assembly and wherein the lock and release means is further operable for releasably locking the pump support and handle in a second position wherein the cart assembly is collapsed wherein the lock and release means comprises a hub with a manually operable cam to release the handle to rotate about the hub.

2. The cart assembly of claim 1 wherein the lock and release means further comprises a lost motion engagement mechanism between the handle and the pump support which allows the handle to rotate from the first position to an intermediate position without rotation of the pump support from the first position.

3. The cart assembly of claim 2 wherein the lost motion engagement mechanism couples the handle to the pump support to rotate the pump support from the first position to the second position as the handle rotates from the intermediate position to the second position.

4. The cart assembly of claim 3 wherein the lock and release means automatically locks the handle and pump support in the second position as the handle is rotated from the intermediate position to the second position.

5. The cart assembly of claim 3 wherein the lock and release means automatically locks the handle and pump support in the first position as the handle is rotated from the intermediate position to the first position.

6. The cart assembly of claim 1 further including a wheel attached to the lower end of each leg.

7. The cart assembly of claim 1 further including a paint pump attached to the pump support.

8. A method of operating a collapsible cart assembly comprising the steps of:
   a) unlocking a handle on a collapsible cart assembly by rotating a hub on the assembly to release the handle for rotation on the collapsible cart assembly;
   b) rotating the handle about the hub from an operating position to an intermediate position;
   c) continuing rotating the handle about the hub from the intermediate position to a storage position;
   d) locking the handle in the storage position;
   e) unlocking a pair of feet attached to the cart assembly by rotating a locking bail from a locked position intermediate the feet to an unlocked position out of the path of the feet;
   f) storing the feet by rotating the feet from an operating position towards the cart assembly to a storage position; and
   g) locking the feet in the storage position by rotating the locking bail from the unlocked position to the locked position wherein the bail retains the feet in the storage position.

9. The method of claim 8 wherein step c further includes driving a pump support on the cart assembly from an operating position to a storage position when the handle moves from the intermediate position to the storage position.

10. A collapsible cart assembly for a paint spray pump comprising:
   a) a pair of spaced apart legs, each extending from a lower end to an upper end;
   b) a pump support extending between the upper ends of the legs;
   c) a pair of feet, with one foot associated with each leg at the lower end thereof;
   d) a handle extending above the pump support; and
   e) lock and release means connected to the handle, pump support and legs and operable for releasably locking the pump support and handle in a first position wherein the pump support positions the pump for operation and the handle is positioned to enable moving the cart assembly and wherein the lock and release means is further operable for releasably locking the pump support and handle in a second position wherein the cart assembly is collapsed wherein the lock and release means further comprises a lost motion engagement mechanism between the handle and the pump support which allows the handle to rotate from the first position to an intermediate position without rotation of the pump support from the first position.

* * * * *